(12) United States Patent
Bailey et al.

(10) Patent No.: US 11,008,077 B2
(45) Date of Patent: May 18, 2021

(54) BONDED INFORMATION DISPLAY FOR MARINE VESSELS

(71) Applicant: NAVICO HOLDING AS, Egersund (NO)

(72) Inventors: Paul Robert Bailey, Auckland (NZ); Alan Van Gerve, Auckland (NZ); Ruan Van Vuren, Auckland (NZ); Matthew W. Laster, Broken Arrow, OK (US); Rafael De Santos Rouzaud, Ensenada (MX); David Urrutia Luna, Ensenada (MX)

(73) Assignee: NAVICO HOLDING AS, Egersund (NO)

( * ) Notice: Subject to any disclaimer, the term of this patent is extended or adjusted under 35 U.S.C. 154(b) by 0 days.

(21) Appl. No.: 16/582,397

(22) Filed: Sep. 25, 2019

(65) Prior Publication Data

US 2020/0102057 A1 Apr. 2, 2020

Related U.S. Application Data

(60) Provisional application No. 62/737,527, filed on Sep. 27, 2018.

(51) Int. Cl.
*B63B 49/00* (2006.01)
*G06F 3/044* (2006.01)
*G06F 3/14* (2006.01)

(52) U.S. Cl.
CPC .............. *B63B 49/00* (2013.01); *G06F 3/044* (2013.01); *G06F 3/1423* (2013.01)

(58) Field of Classification Search
CPC ....... B63B 49/00; G01C 21/203; G06F 3/011; G06F 3/044; G06F 3/1423
See application file for complete search history.

(56) References Cited

U.S. PATENT DOCUMENTS 8,762,982 B1 6/2014 Goslee
9,718,530 B2 8/2017 Kabel et al.
(Continued)

FOREIGN PATENT DOCUMENTS

CN 103 832 561 A 6/2014
KR 100 931 989 B1 12/2009

OTHER PUBLICATIONS

"MDI—Marine Digital Integrators;" Feb. 13, 2018; retrieved Sep. 30, 2019 from https://www.youtube.com/watch?v=mXIGCtK6d4E.
(Continued)

*Primary Examiner* — Nelson M Rosario
(74) *Attorney, Agent, or Firm* — Nelson Mullins Riley & Scarborough LLP

(57) ABSTRACT

Systems, assemblies, and methods for providing a bonded marine information display for a watercraft are provided herein. An example bonded marine information display assembly for installation on a vessel includes a plurality of user interface displays for displaying marine data to a user. Each of the plurality of user interface displays includes a front face and a screen. The assembly includes an overlay pane defining a front face and a rear face. The rear face of the overlay pane is bonded to the front face of each of the plurality of user interface displays such that each screen of the plurality of user interface displays is visible through the overlay pane. An integration hub may be included, where the integration hub includes a communication interface configured to provide data communication between the plurality of user interface displays and one or more peripheral devices. Methods of manufacturing accordingly are also provided.

19 Claims, 34 Drawing Sheets

(56) References Cited

U.S. PATENT DOCUMENTS

| | | |
|---|---|---|
| 9,827,736 B2 * | 11/2017 | Suess .................... B60K 37/02 |
| 2007/0008186 A1 | 1/2007 | Michaels et al. |
| 2010/0127847 A1 | 5/2010 | Evans et al. |
| 2013/0157647 A1 | 6/2013 | Kolodziej |
| 2014/0071059 A1 | 3/2014 | Girault |
| 2014/0210605 A1 | 7/2014 | Abel et al. |

OTHER PUBLICATIONS

"Marine Products;" Teak Isle MFG; retrieved Sep. 30, 2019 from http://www.teakisle.com/products_marine.asp.
Feb. 12, 2020 Search Report and Written Opinion issued in International Patent Application No. PCT/IB2019/001039; 12 pp.

* cited by examiner

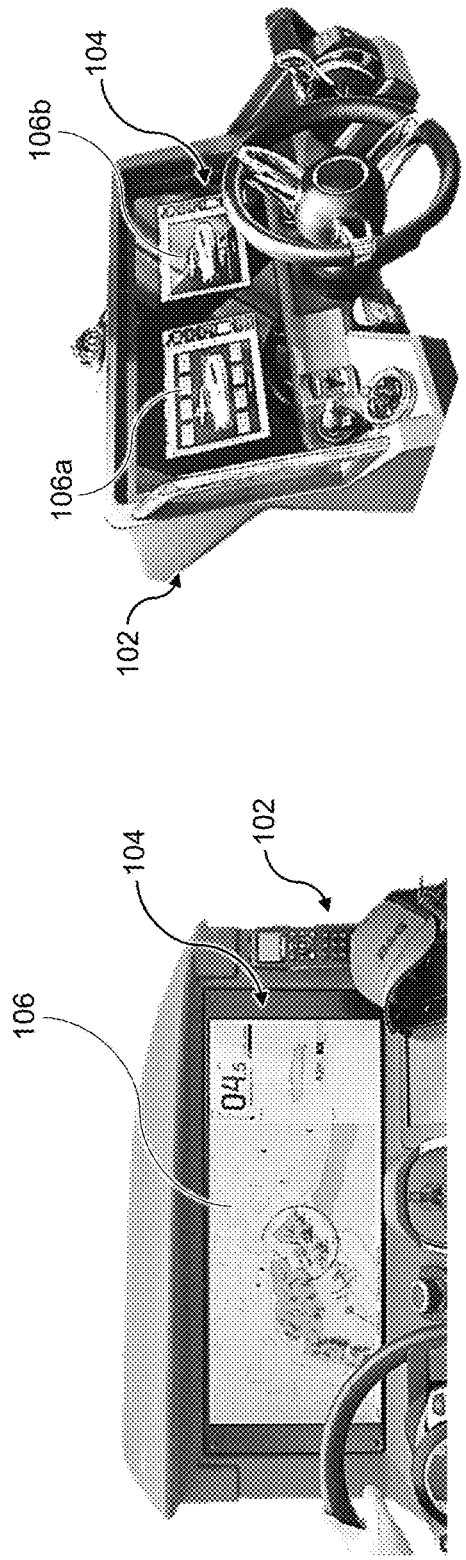
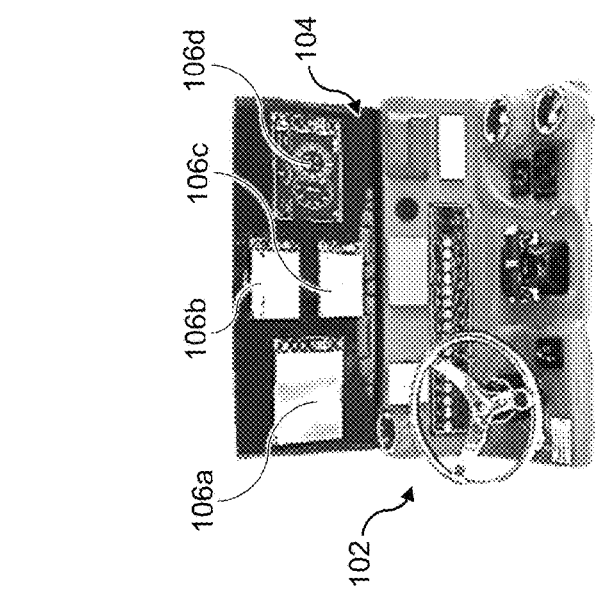
FIG. 2A
FIG. 2B
FIG. 2C

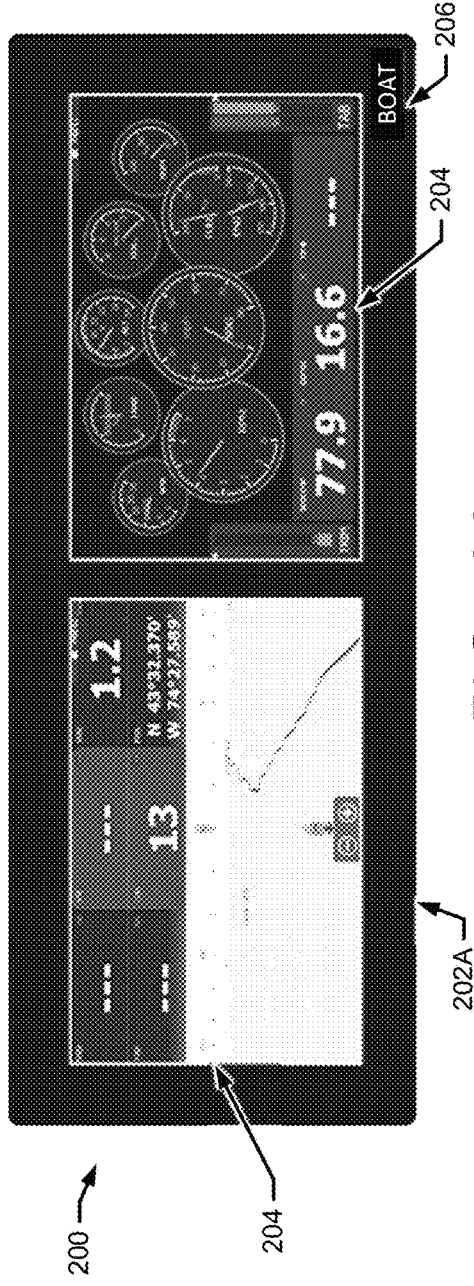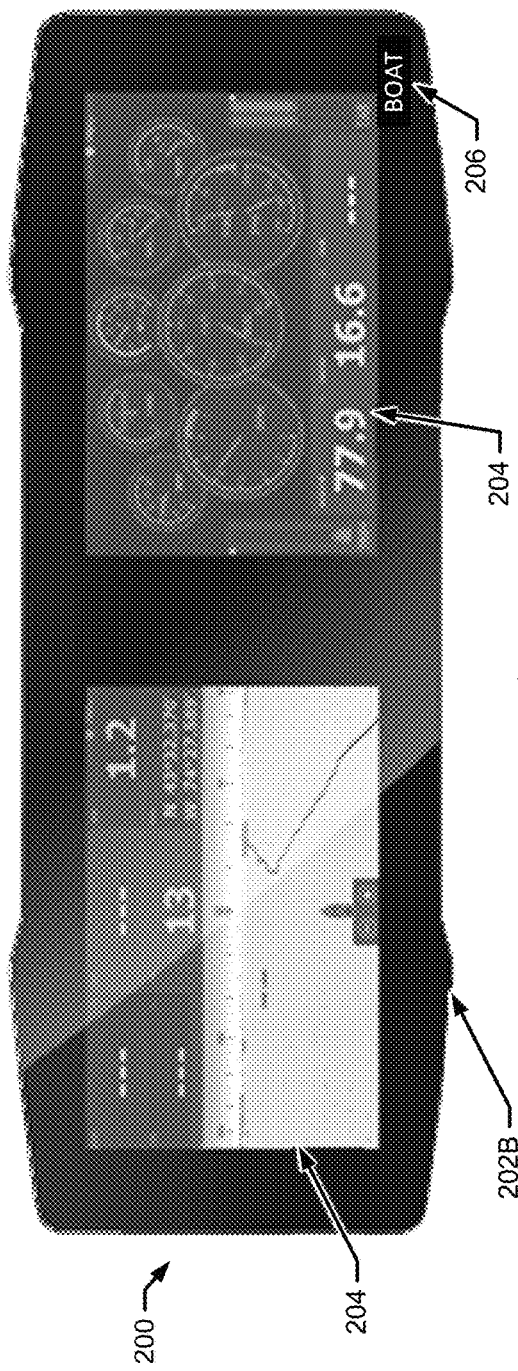
FIG. 4A
FIG. 4B

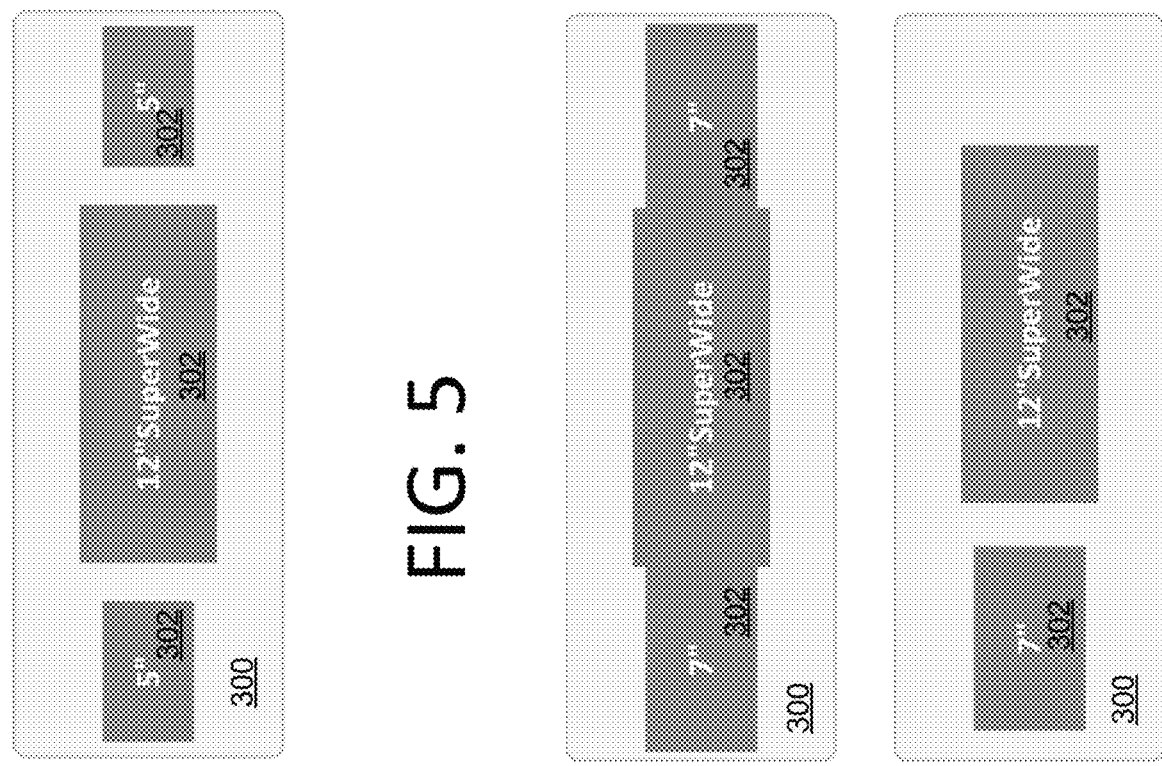
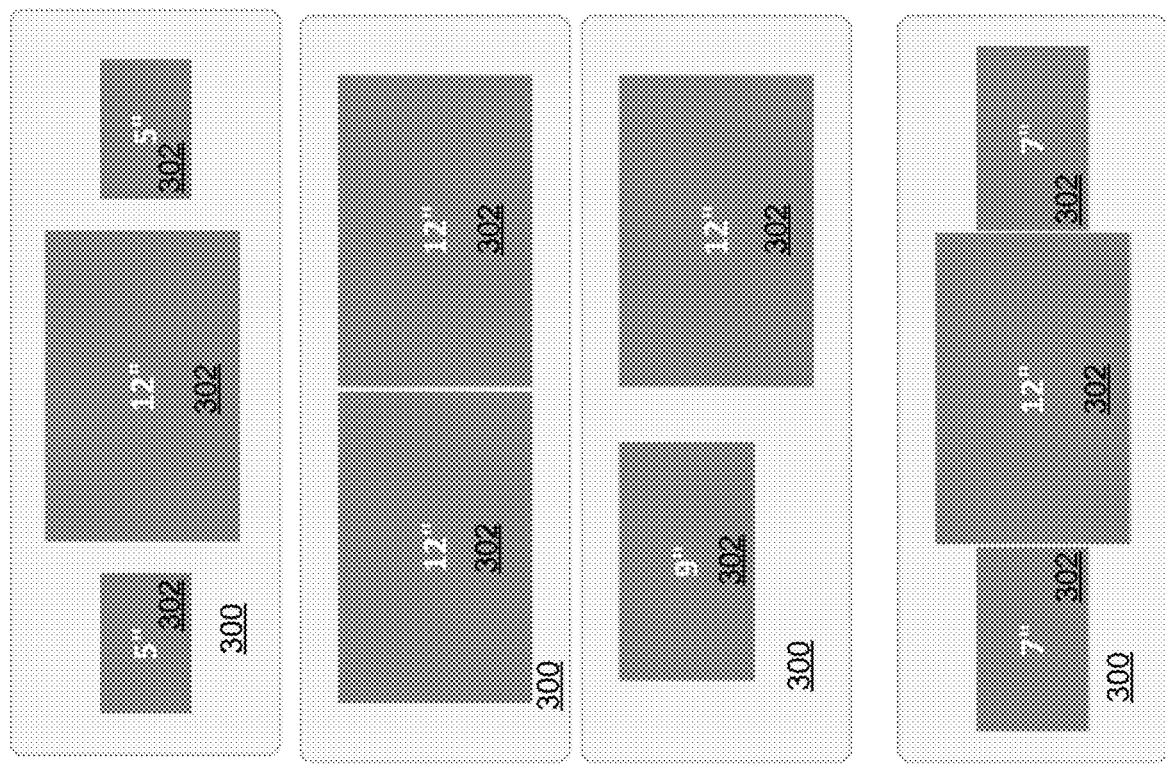
FIG. 5

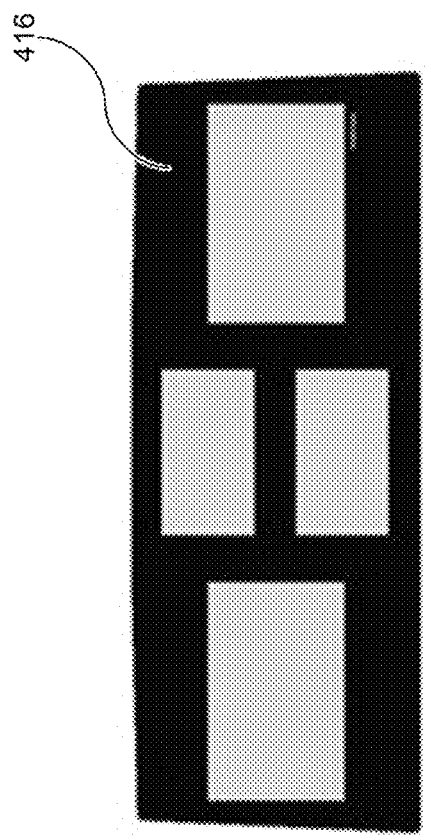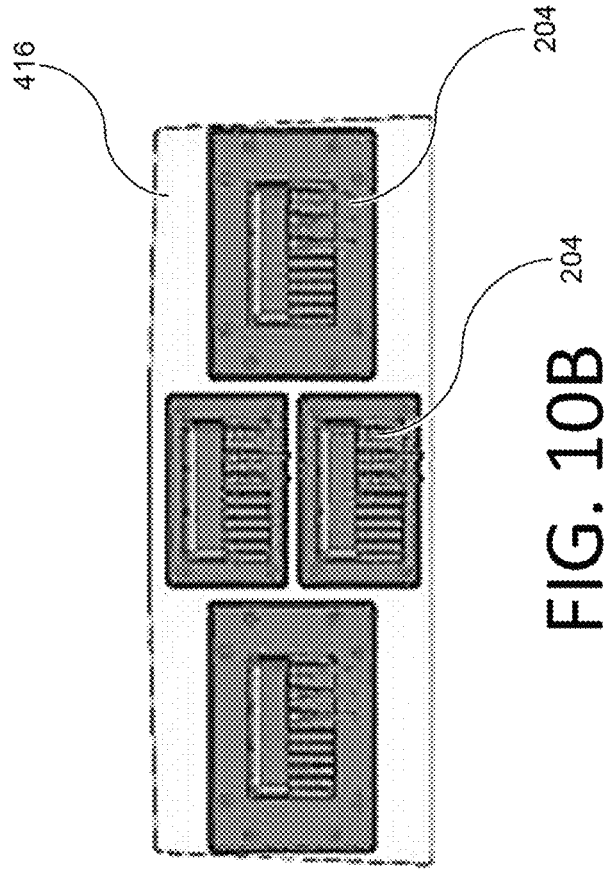
FIG. 10A
FIG. 10B

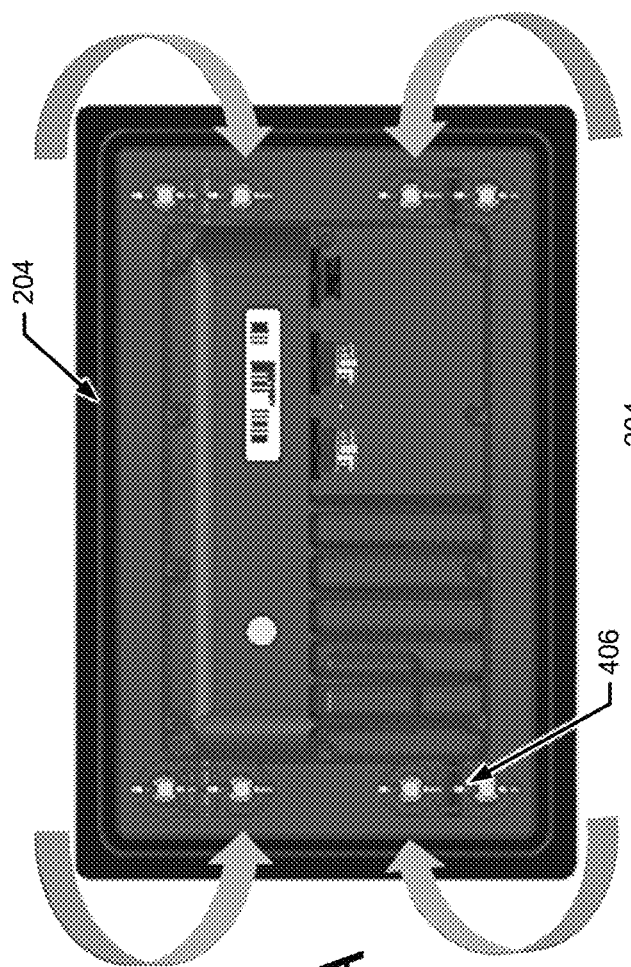
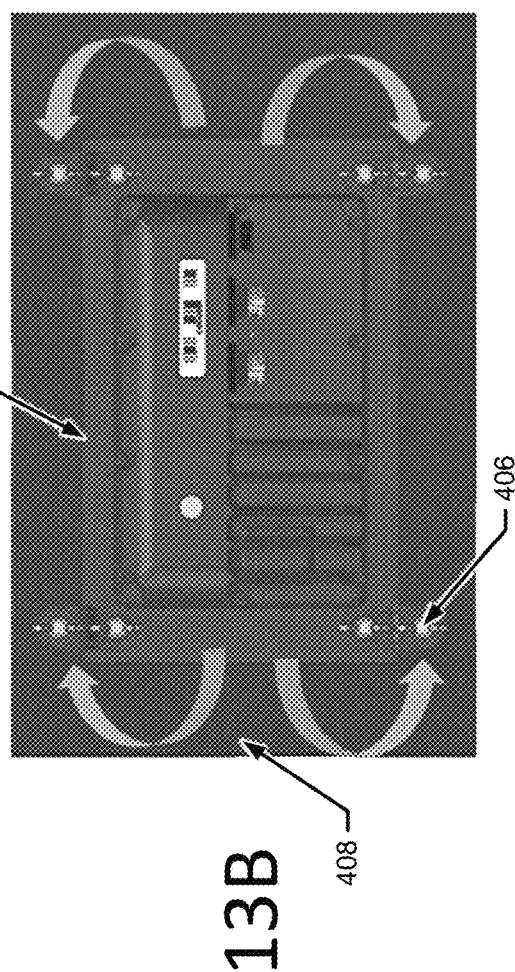
FIG. 13A
FIG. 13B

BONDED INFORMATION DISPLAY FOR MARINE VESSELS

CROSS-REFERENCE TO RELATED APPLICATION(S)

The present application claims priority to U.S. Provisional Application No. 62/737,527, filed Sep. 27, 2018, entitled "Bonded Instrument Display for Marine Vessels", which is incorporated by reference in its entirety.

FIELD OF THE DISCLOSURE

Embodiments of the present disclosure relate generally to marine displays and, more particularly, to a bonded information display for a marine vessel.

BACKGROUND OF THE DISCLOSURE

Typically, watercraft builders build dash assemblies (e.g., control components and displays for the helm) using components from multiple manufacturers. The components are installed through a backboard of the helm, wired together, and configured by the watercraft builder and/or a third party.

Assembly of a dashboard or helm in this manner may cause the industrial design of the resulting helm control center to be inconsistent, as each manufacturer has different designs for their products. The product design may even vary within the same brand, manufacturer, and/or watercraft builder. The overall look of the helm may appear disjointed, especially contrasted with a generally sleek form applied to the marine vessel by the watercraft builder. The housings of the various components may have different curvatures and/or peripheries that clash when placed side-by-side, projecting out of the backboard of the helm. Further, each component may have the corresponding logo for the manufacturer prominently displayed in differing fonts, colors, sizes, etc. Where multiple components have display screens, these screens may have radically different color outputs, resolutions, and lighting, for example. Taken as a whole, the aesthetics and branding of the marine vessel intended by the watercraft builder may be compromised by the hardware of the assorted components in the dashboard assembly.

BRIEF SUMMARY OF THE DISCLOSURE

Often, components from each manufacturer are standard components, designed to fulfill a single function or a subset of the overall functions desired on the helm; thus, the resulting helm dashboard assembly may have significant overlap in functionalities and/or a lack of integration. Redundancies in the resulting assembly may be inefficient from the perspective of both cost and space. Additionally, the wiring of these various components may be complex. Complicated wiring could result in cord management problems, costly converters, incompatible interfaces, unnecessary power cords, extra heat and/or shielding issues, etc. The internal hardware of the components may contribute to wireless signal and/or other types of interference. Moreover, any integration of the components may be difficult or impossible to implement and may not provide a full or functional integration of all the various capabilities.

The proprietary software of each component of the dashboard assembly may cause further issues. For example, the software for some components may be incompatible with incoming data, which could cause problems with peripheral detection and/or communication between components. The components may have vastly different user interface layouts and menus that each operate differently and may clash in terms of brand identity, type design, color schemes, etc. Moreover, it may be hard for a user to memorize and/or quickly switch between the functions and navigation for each of the various user interfaces, which may limit the usability of the overall helm operations, possibly leading to safety issues.

Waterproofing of dashboard assembly components may add to costs, especially where components are designed for both in-dash and bracket mount installation on a helm. Such costs would otherwise be unnecessary if the components were protected by the dash assembly itself. Moreover, in any environment, as more seams or joints are included in the assortment of components, the risk of damage or deterioration of seals increases, resulting in unwanted entry of water and/or debris into components thereby accelerating their time to failure.

Embodiments of the present disclosure provide for various bonded marine information displays that cure many of the above noted defects and difficulties. In this regard, in some embodiments, an assembly is specifically designed for the watercraft manufacturer to provide a cost effective and aesthetically desirable design, which also offers integration of components. More particularly, a single piece overlay pane may be designed (e.g., in shape and size) to correspond to and be easily installed into a dashboard of the helm or elsewhere in a specific vessel. The bonded marine information display may include one or more user interface displays bonded to a rear face of the overlay pane, which may provide a seamless and waterproof solution. Customization of the number and placement of the user interface displays provides for improved optionality and aesthetic look for each watercraft manufacturer. The bonded marine information display may provide a sleek, custom, and fully upgradable dash control.

Further, an integration hub included and/or built-in to the system of the bonded marine information display may be able to share information from all systems onboard a vessel. The integration hub of the bonded marine information display may provide integration of all major components on the vessel (e.g., engines, batteries, anchors, digital switching, stereos, air-conditioning, generators, trim tabs, etc.) controlled by a central display for easier and better control and comfort. The graphical user interface of the bonded marine information display may be fully configurable and designed to present necessary information when users need it. In some embodiments, the bonded marine information display may be cloud-connected to provide data and digital services to/from a host of boating industry partners, which may add to the safety and enjoyment of a user's experience. Using the networking and communication abilities of the integration hub, the bonded marine information display may provide seamless connectivity and control of a vessel via a multi-functional display, mobile phone, tablet, etc., whether the user is on or off the vessel. The integrational capabilities of the bonded marine information display may provide a user or watercraft manufacturer with the ability to automate activities and make changes to the various vessel systems.

In one exemplary embodiment, a marine information display assembly for installation on a marine vessel is provided. The marine information display assembly may include an overlay pane and a plurality of user interface displays for displaying marine data to a user. Each of the plurality of user interface displays may include a front face and a screen. The overlay pane may define a front face and a rear face. The rear face of the overlay pane may be bonded to the front face of each of the plurality of user interface displays such that each screen of the plurality of user interface displays is visible through the overlay pane. The marine information display may further include an integration hub. The integration hub may include a communication interface configured to provide data communication between the plurality of user interface displays and one or more peripheral devices. The communication interface may include at least one Ethernet interface for controlling communications between the integration hub and the plurality of user interface displays. The marine information display may further include a protective mounting frame configured to surround the plurality of user interface displays and abut the rear face of the overlay pane. Each of the plurality of user interface displays may include a rear mounting connection configured to engage with a compression bracket. The compression bracket may be configured to hold the protective mounting frame in place against the overlay pane. At least one of the plurality of user interface displays may comprise a touchscreen. The overlay pane may be glass or polycarbonate. The marine information display may further include a mounting ring disposed around a periphery of the overlay pane.

In another exemplary embodiment, a marine information display system for attachment to a marine vessel is provided. The marine information display system may include a plurality of user interface displays and an integration hub in communication with the plurality of user interface displays. Each of the plurality of user interface displays may include a front face and a screen. Each front face may be bonded to a rear face of an overlay pane such that the screen of each of the plurality of user interface displays is visible through the overlay pane. The integration hub may include a processor, a communication interface, and memory.

In another exemplary embodiment, a method of manufacturing a marine information display is provided. The method may include forming an overlay pane and bonding a plurality of user interface displays to a rear face of the overlay pane. The overlay pane may be formed according to a periphery shape. The plurality of user interface displays may be bonded to the rear face of the overlay pane by bonding a front face of each of the plurality of user interface displays to the rear face of the overlay pane. The method may further include connecting a capacitive touch panel to each of the plurality of user interface displays prior to the bonding. The method may further include applying a protective laminate film to the overlay pane. The method may further include connecting the plurality of user interface displays to an integration hub for transmission of power and data between the plurality of user interface displays and peripheral devices. The integration hub may include a processor and a memory. The method may further include marking at least one of the overlay pane and the protective mounting frame with a logo according to a boat profile. The method may further include storing computer-readable code indicating the boat profile in the memory of the integration hub. The method may further include providing selectable size options for the plurality of user interface displays. The method may further include providing selectable shape and size options for the periphery shape for the overlay pane. The overlay pane may be formed based on a selected shape and size option. The method may further include inserting each of the plurality of user interface displays into a protective mounting frame. The method may further include connecting a compression bracket to a rear mounting connection of each of the plurality of user interface displays. The method may further include rotating and tightening the compression bracket such that pressure is applied to the protective mounting frame directed toward the overlay pane.

In another exemplary embodiment, a marine information display system for attachment to a helm of a marine vessel is provided. The marine information display system may include an overlay pane and a user interface display for displaying marine data to a user. The overlay pane may define a front face and a rear face. The overlay pane may have a periphery shape with a width. The width of the overlay pane may extend substantially across an entire width of the helm. The periphery shape of the overlay pane may correspond to one or more contours of the helm. The user interface display may include a front face and a screen, defining a width. The front face of the user interface display may be bonded to the rear face of the overlay pane such that the user interface display is visible through the overlay pane. The width of the screen of the user interface display may be less than the width of the overlay pane.

BRIEF DESCRIPTION OF THE DRAWINGS

Figure 1:
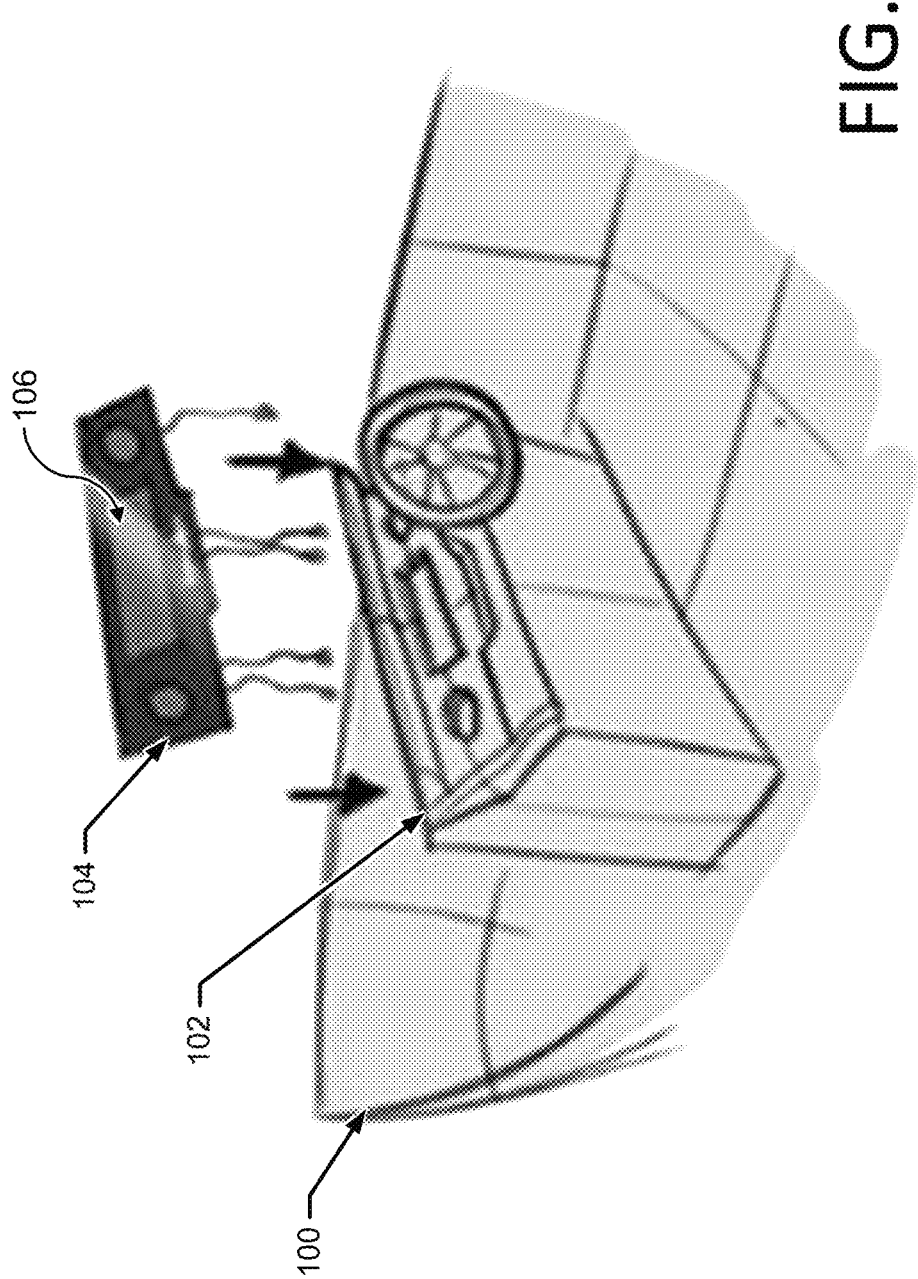
Figure 3:
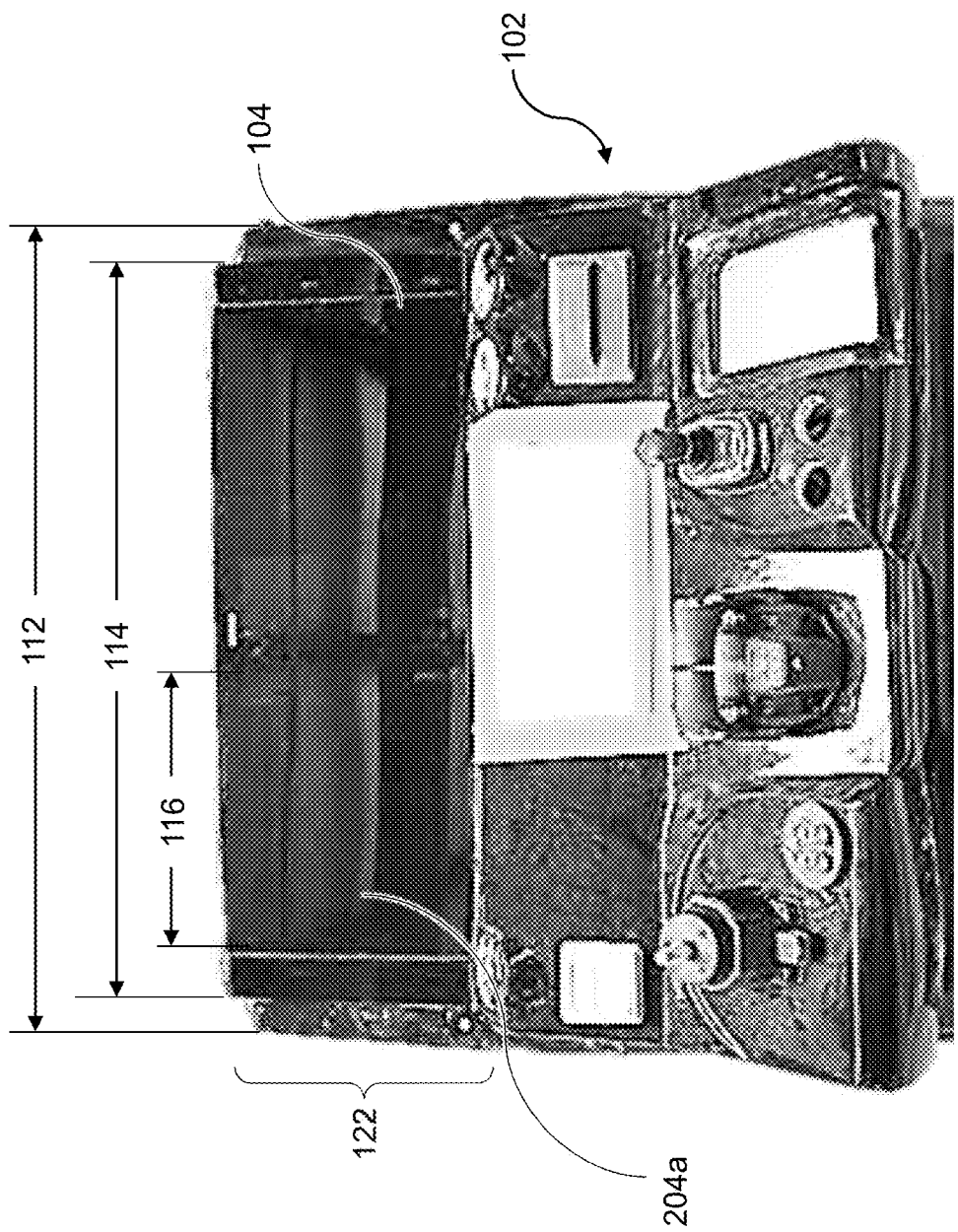
Figure 6A:
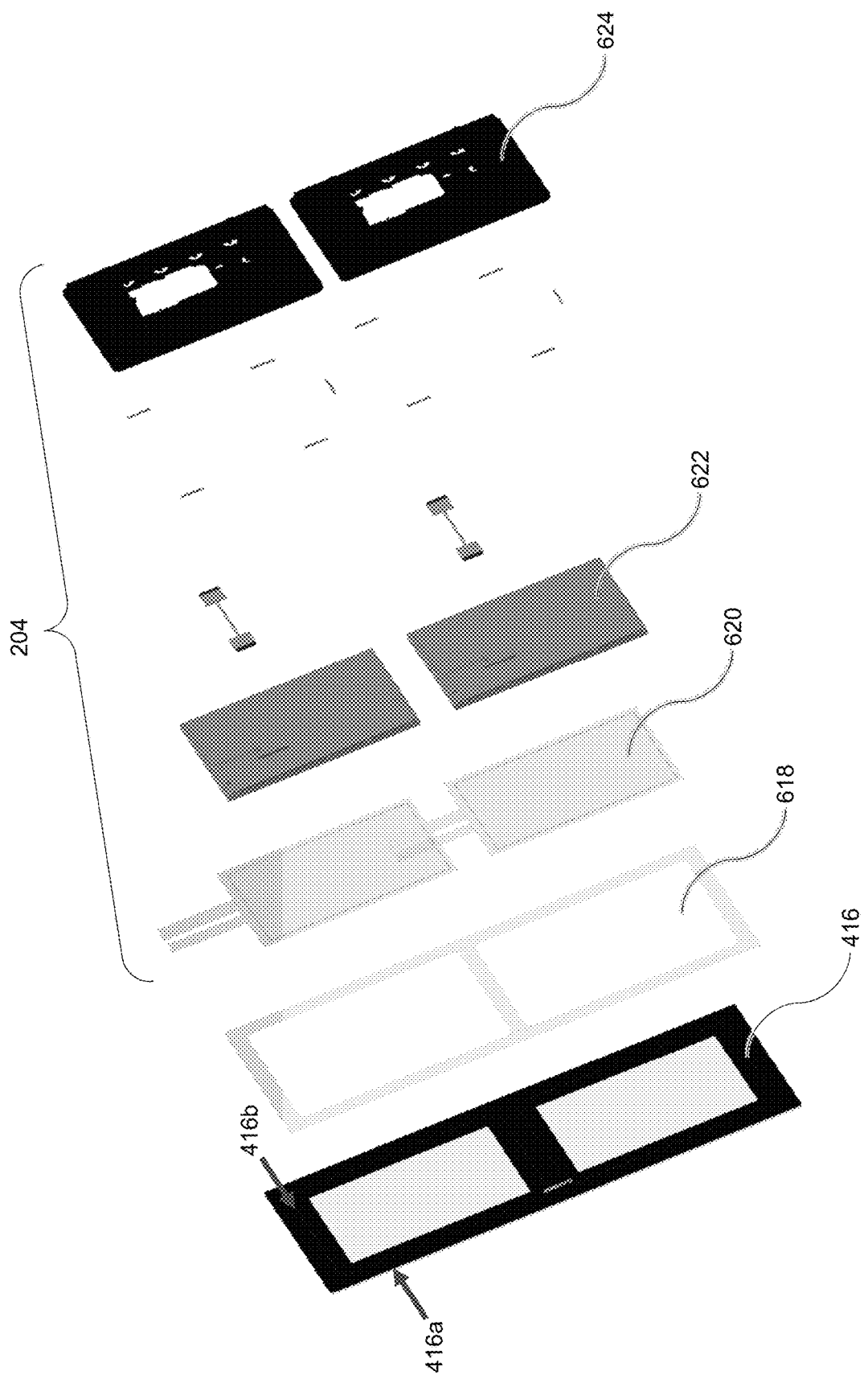
Figure 6B:
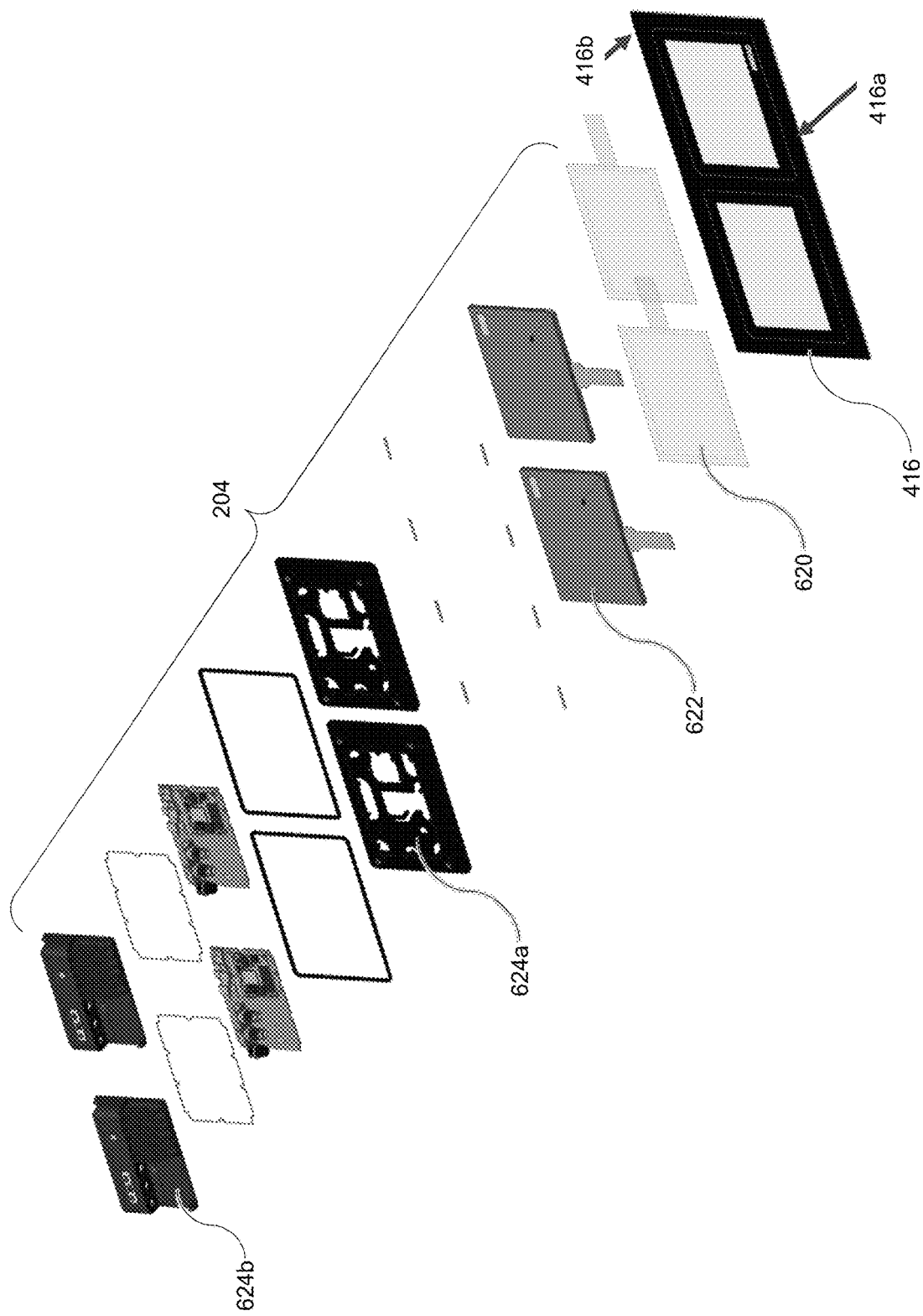
Figure 7:
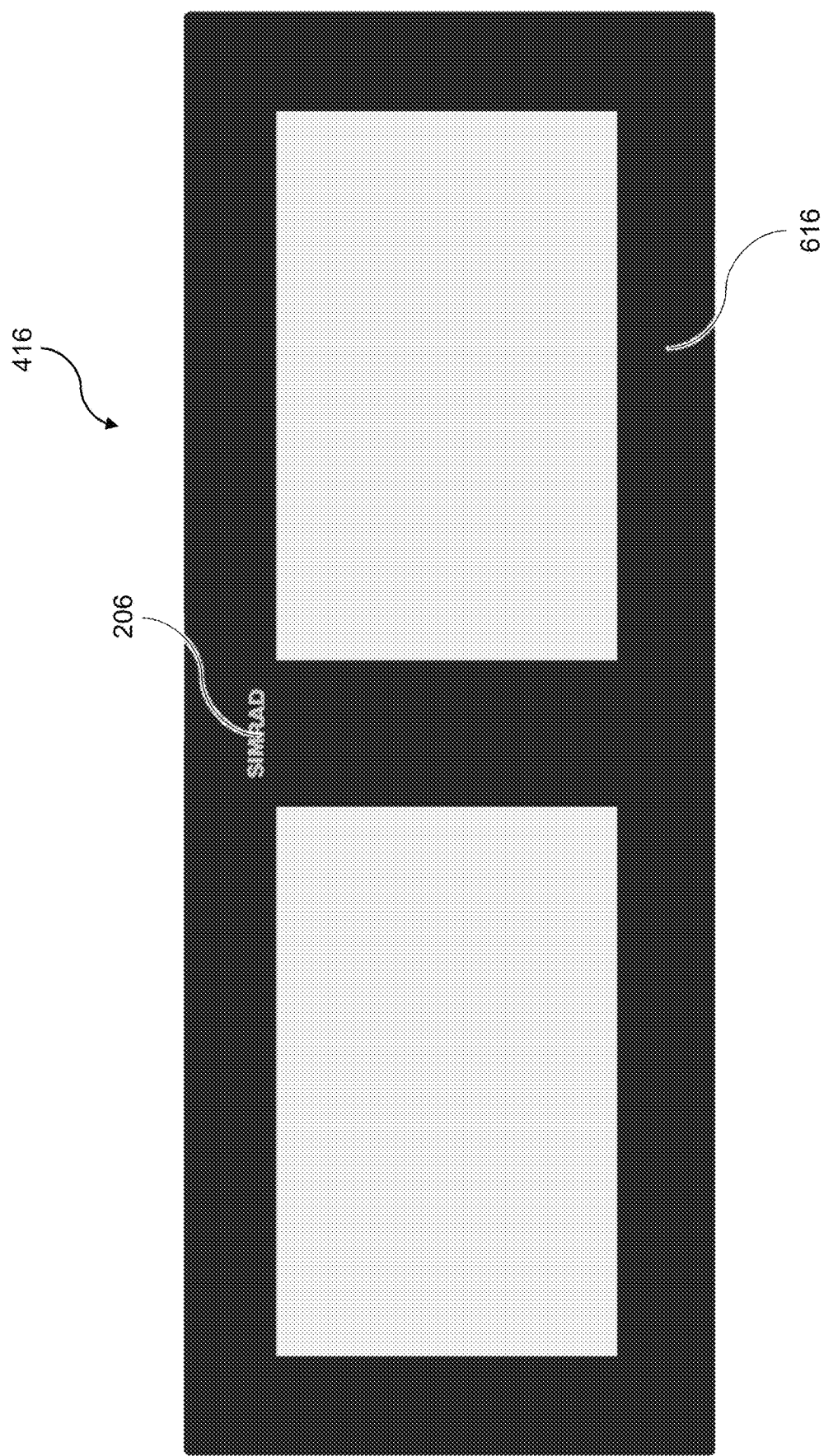
Figure 8:
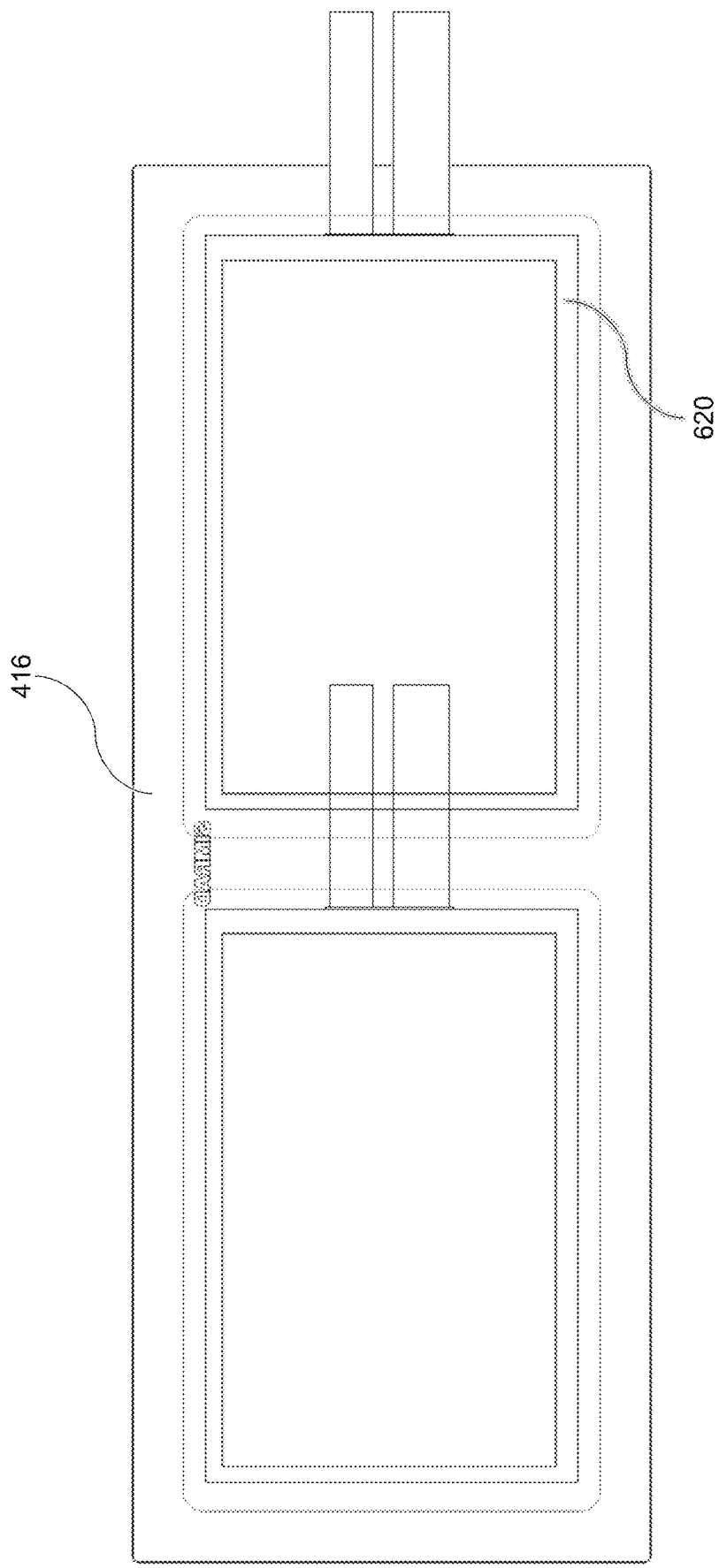
Figure 9:
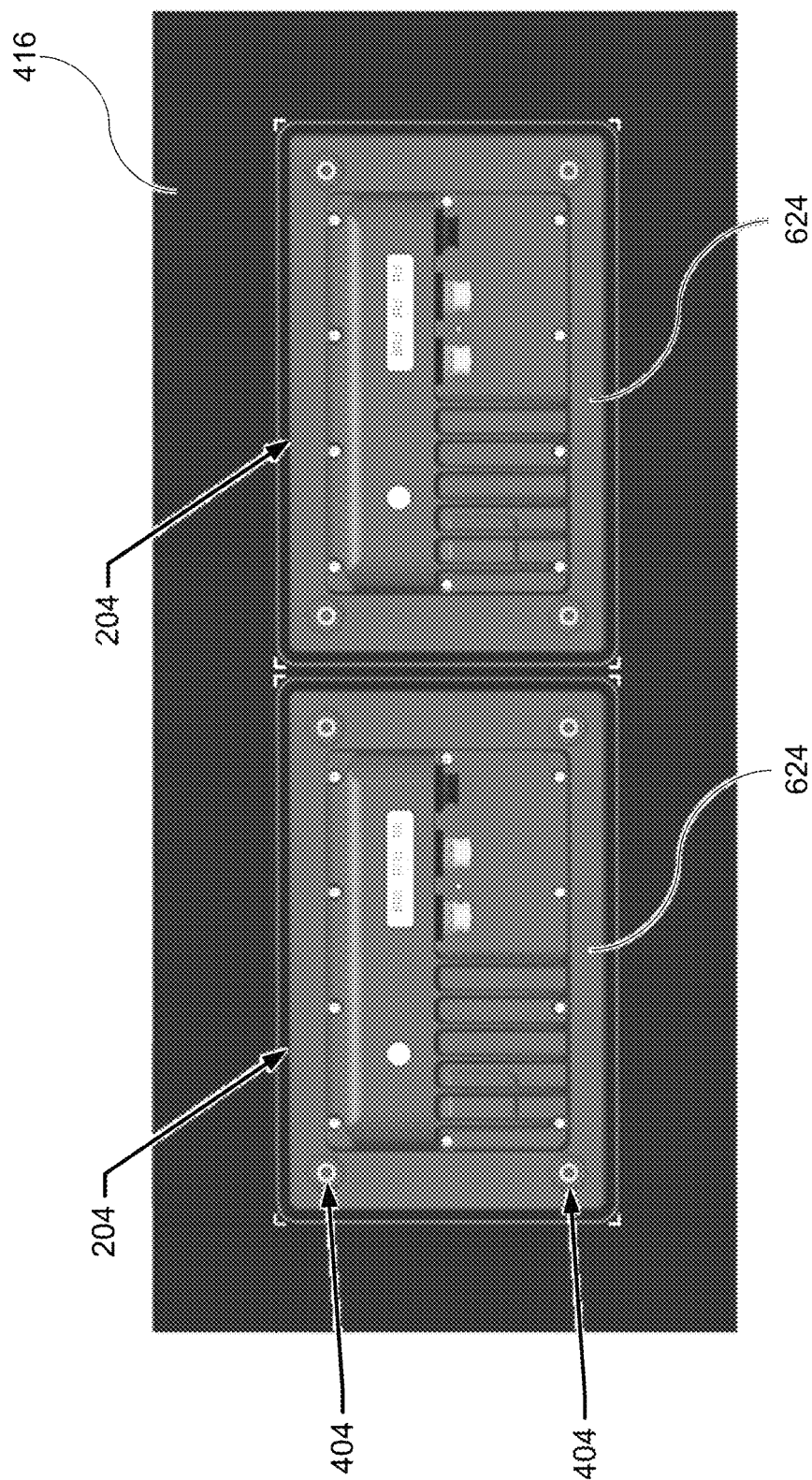
Figures 11A, 11B:
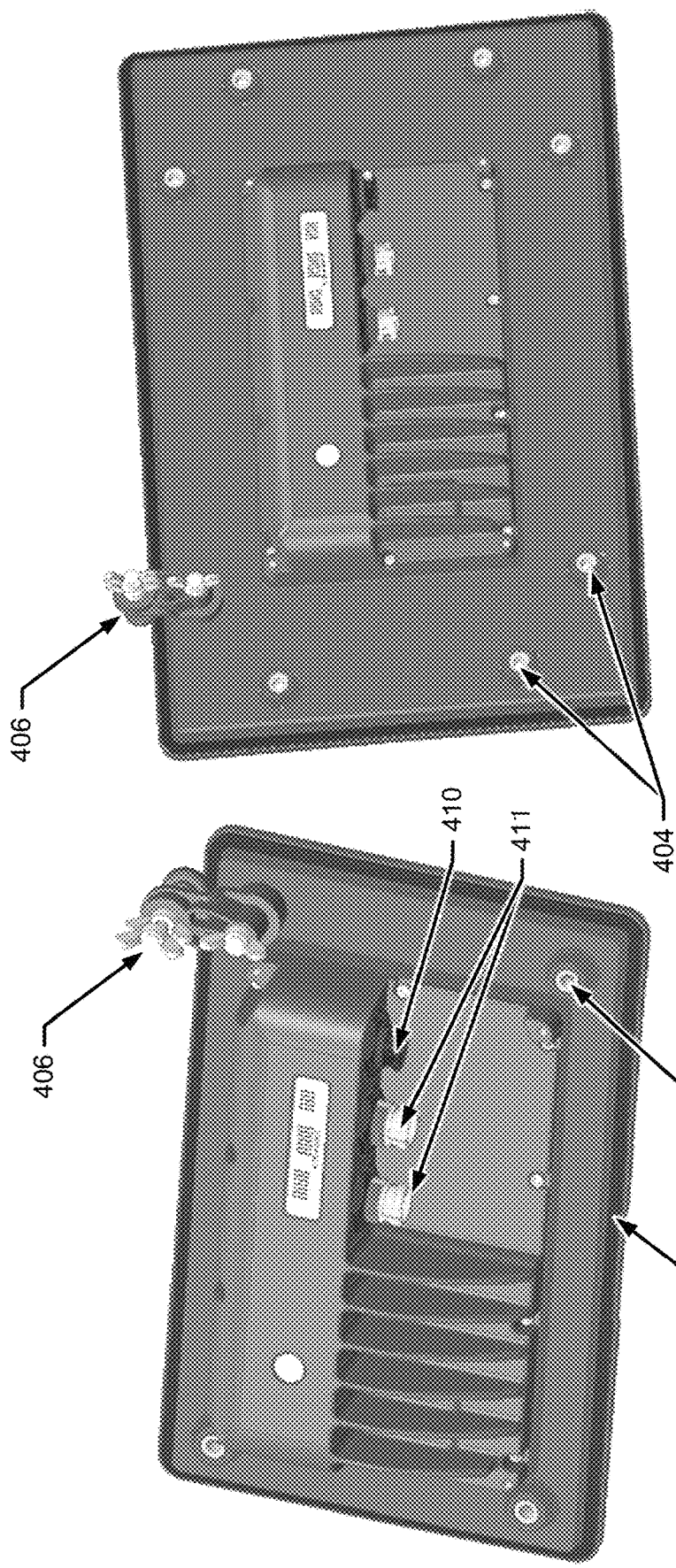
Figure 15:
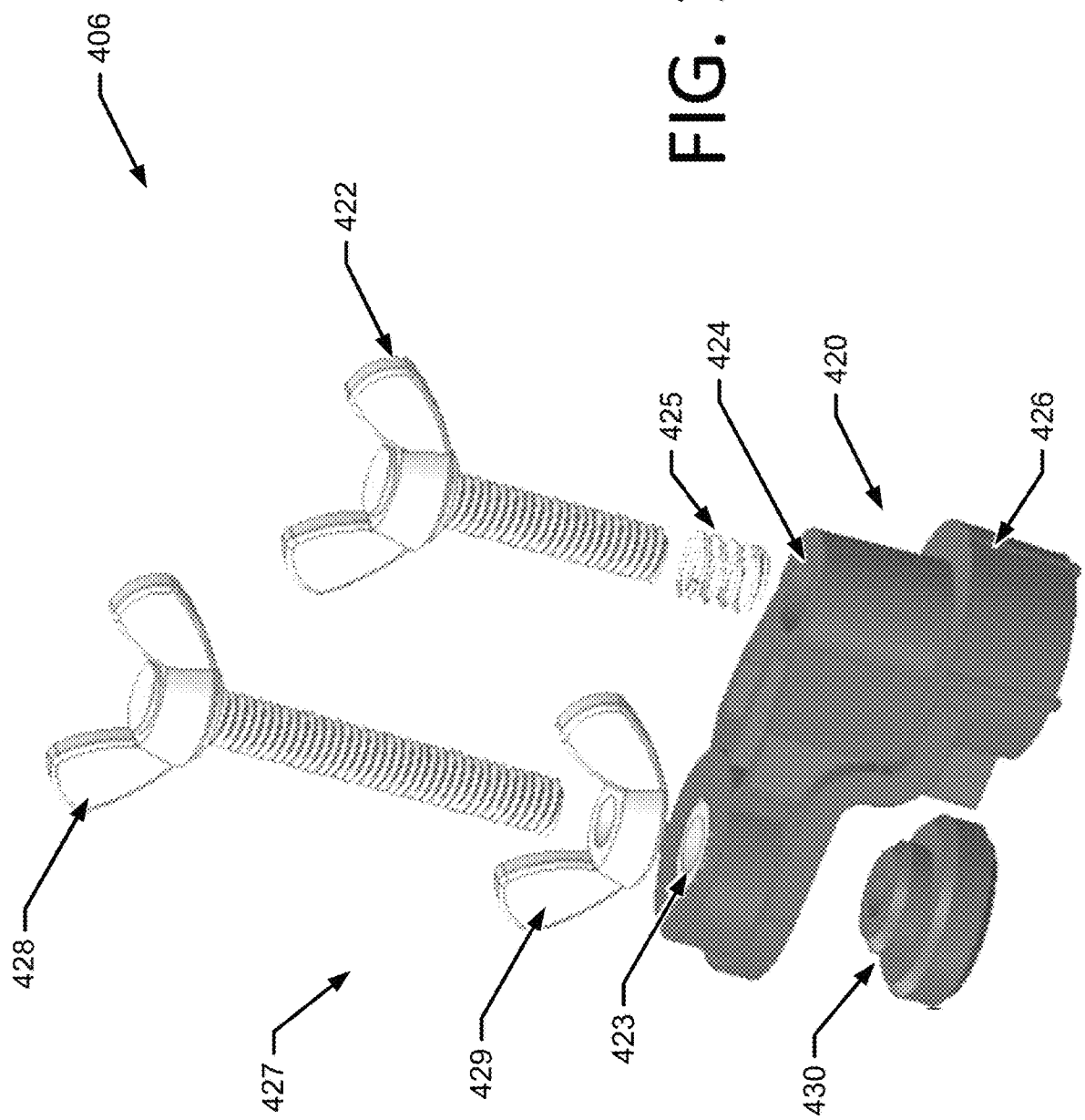
Figure 16:
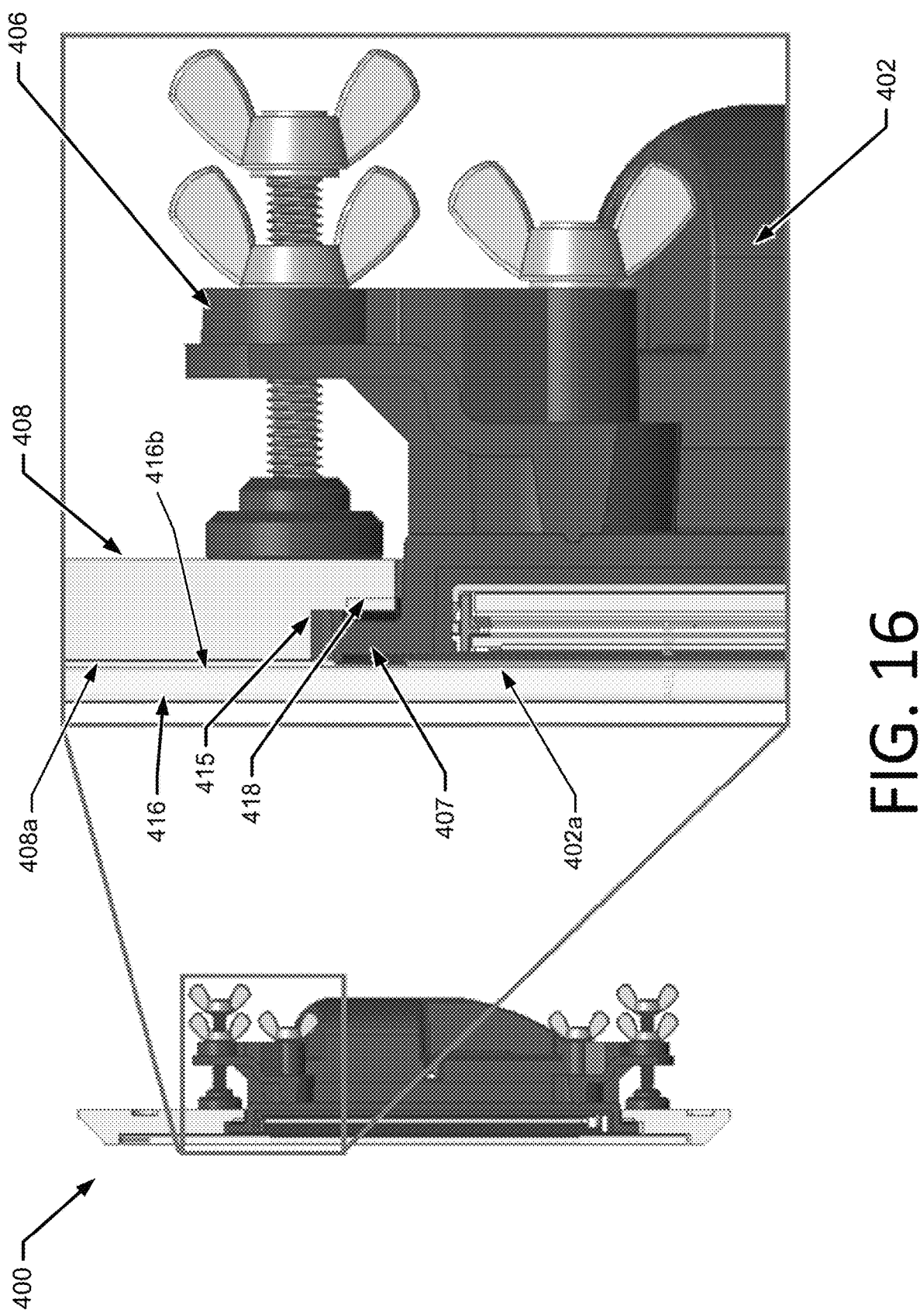
Figure 17A:
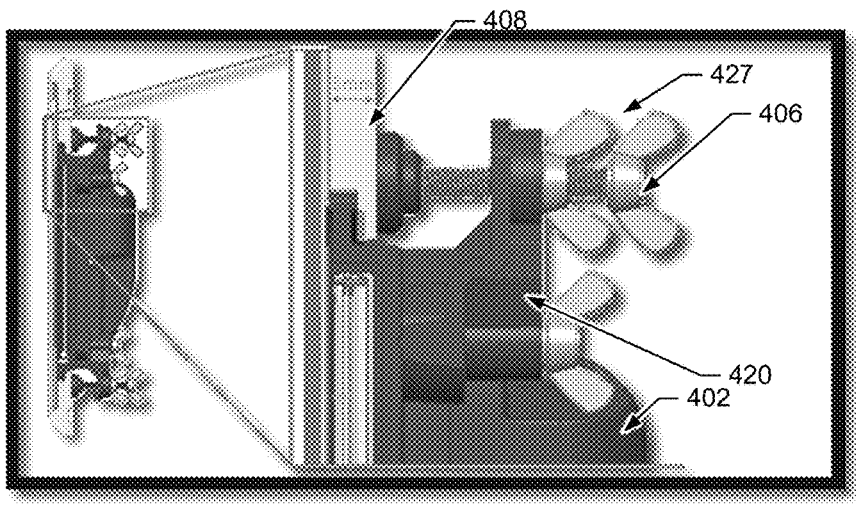
Figure 17B:
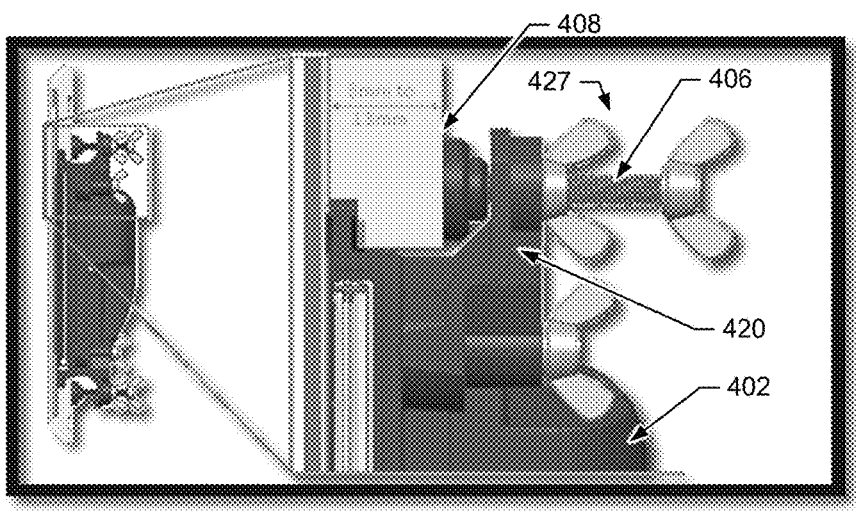
Figure 17C:
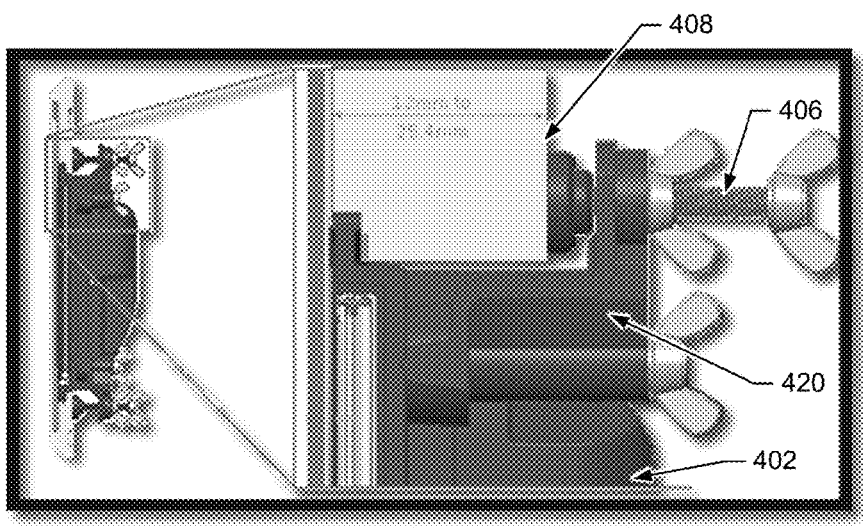
Figure 18:
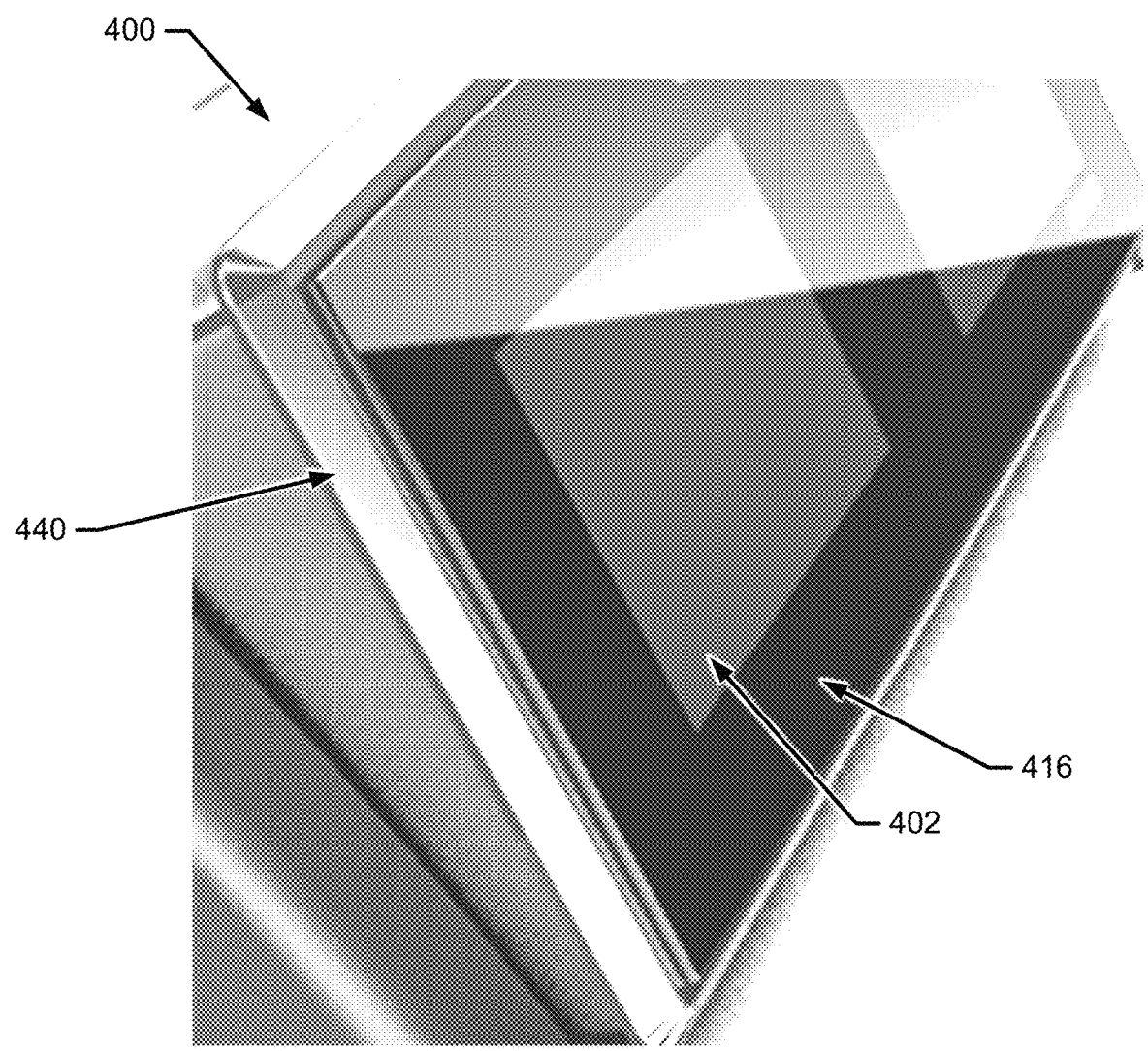
Figure 19:
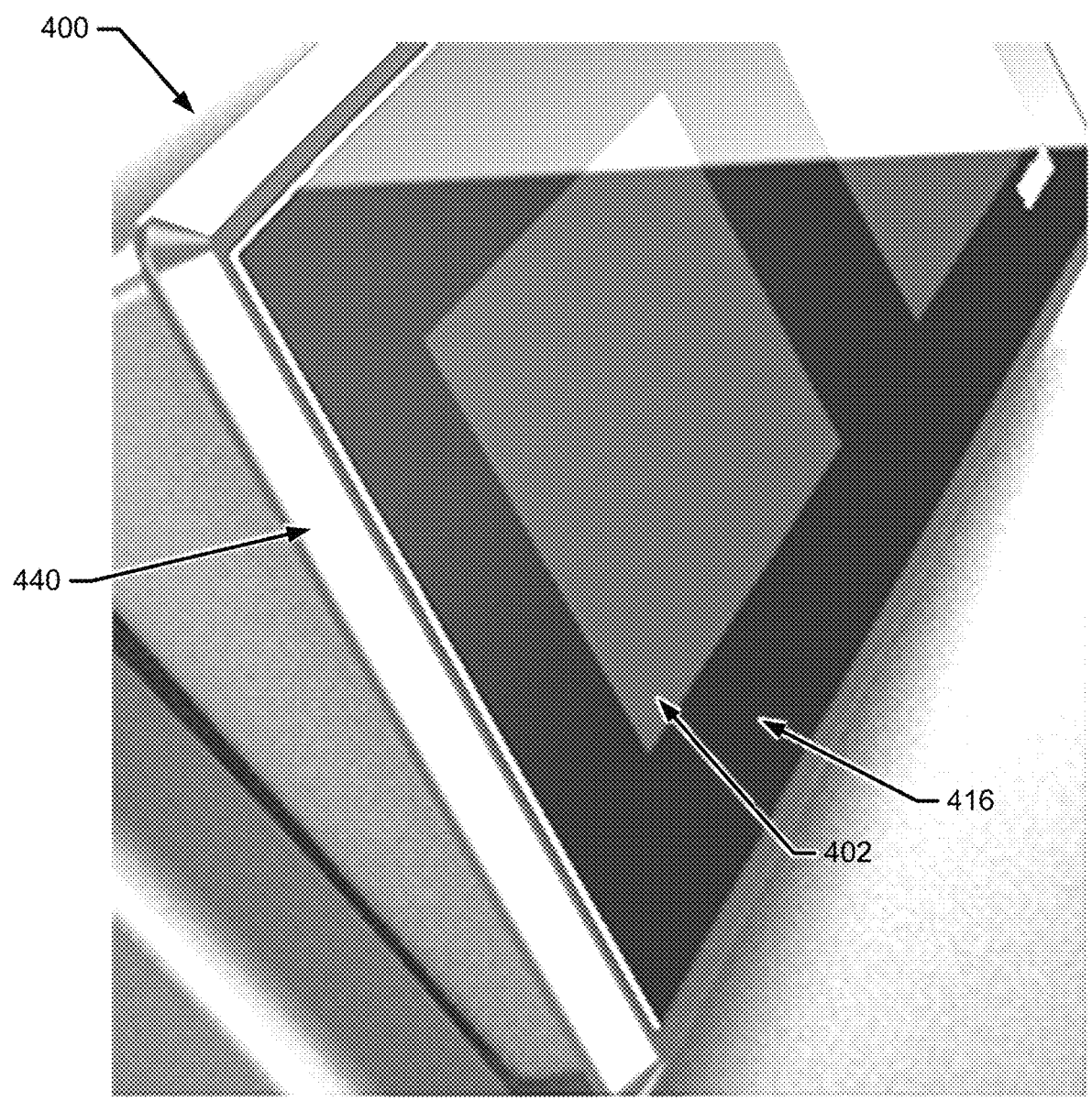
Figure 20:
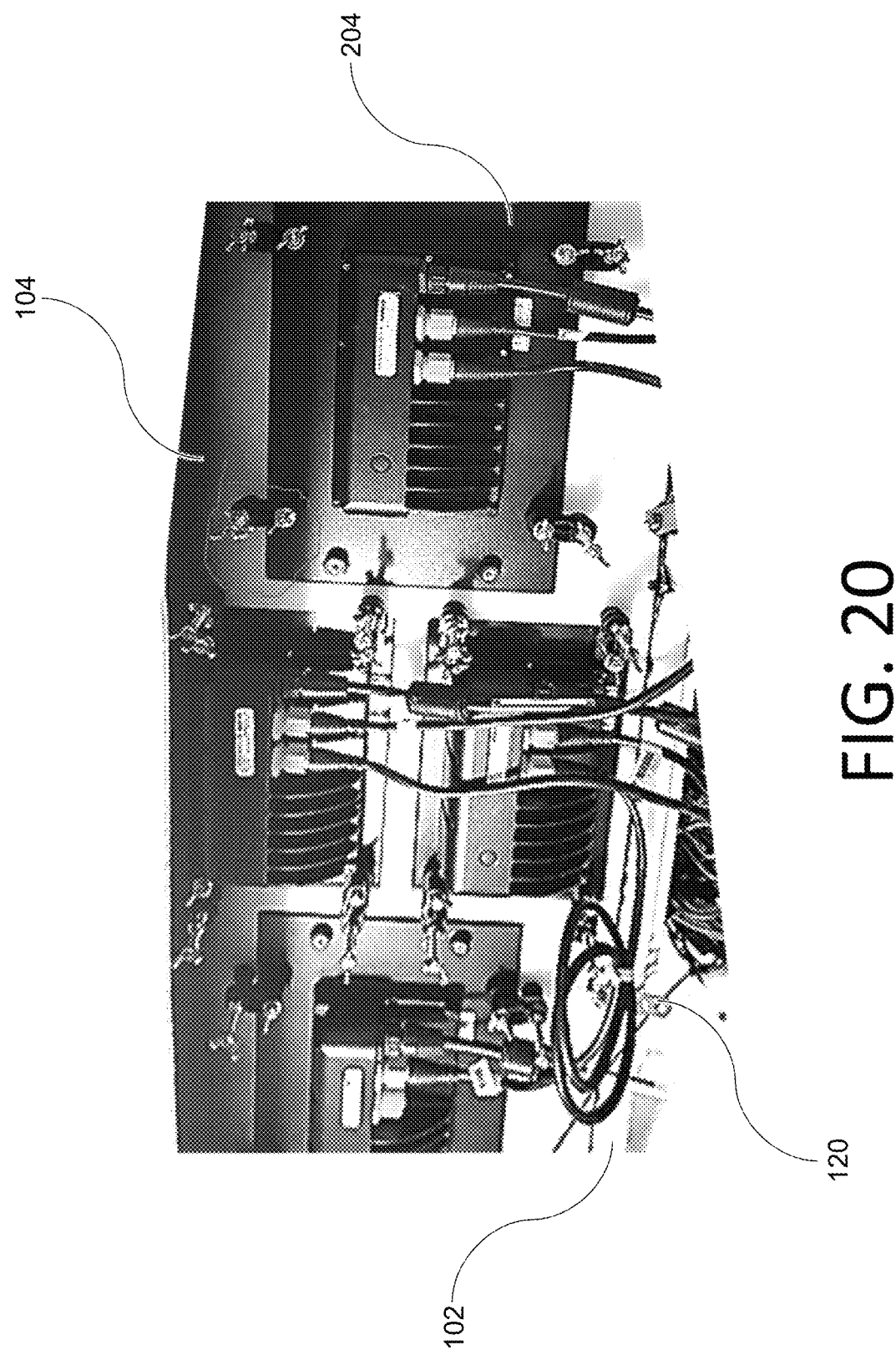
Figure 21:
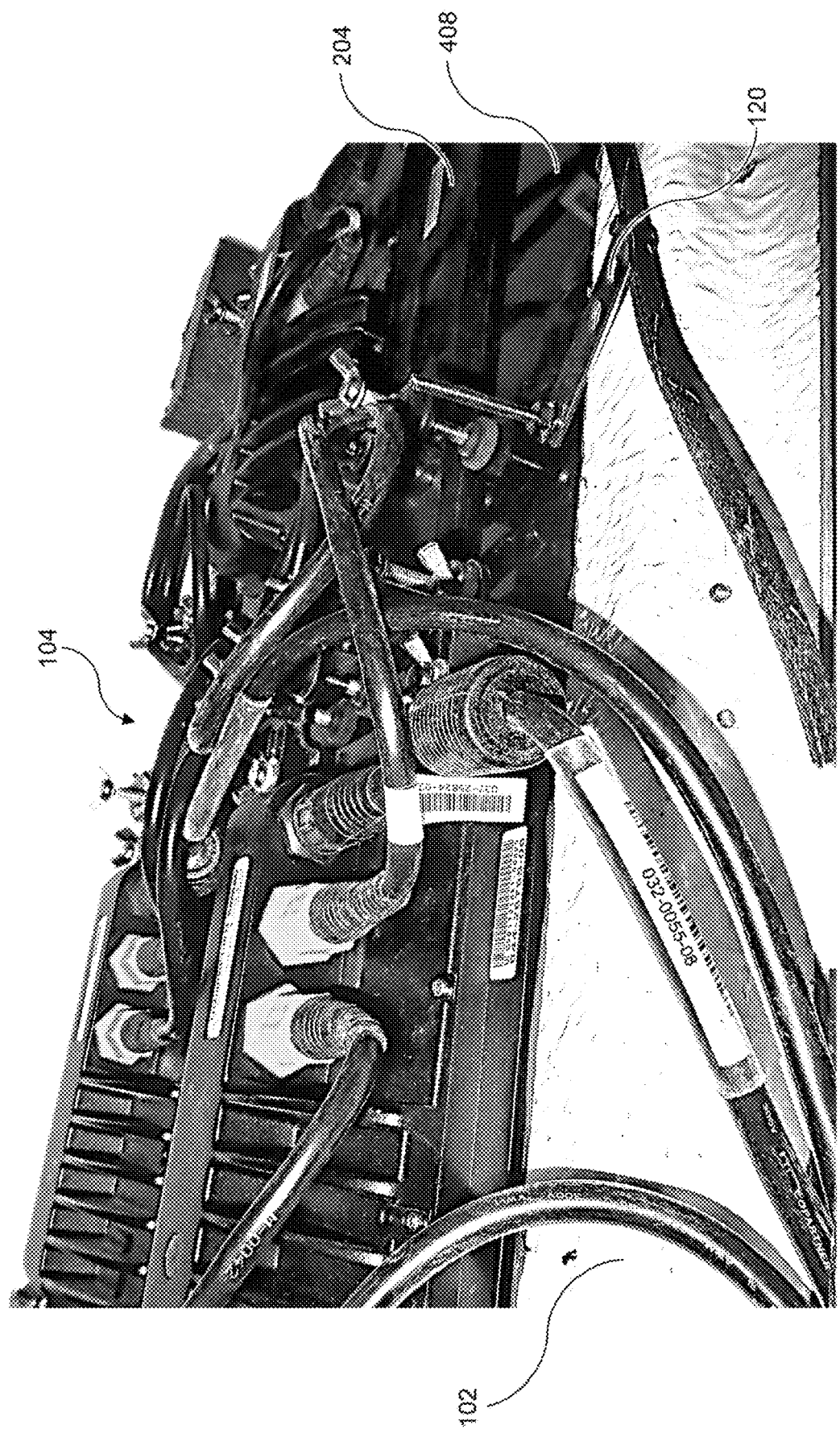
Figure 22:
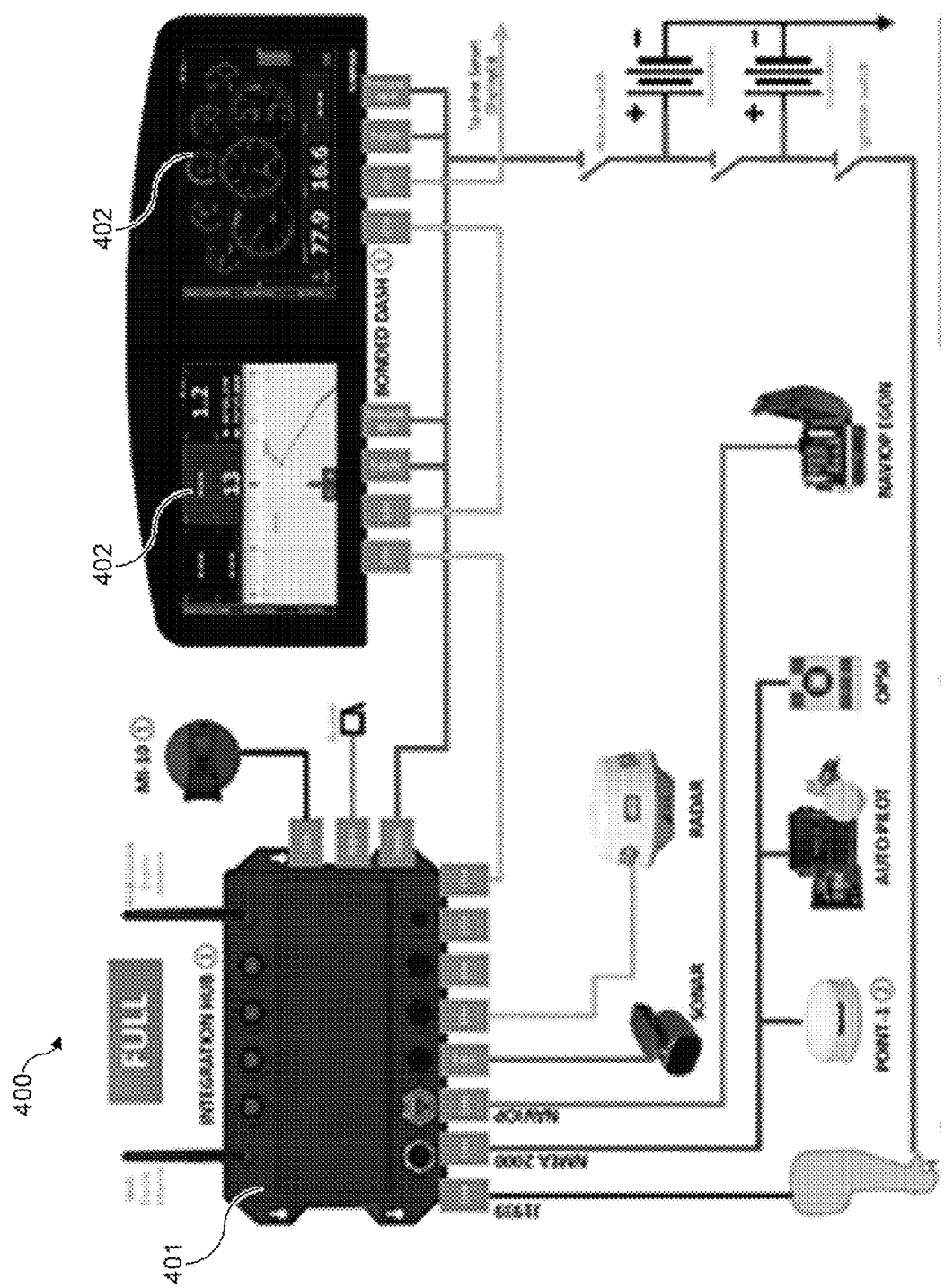
Figure 23:
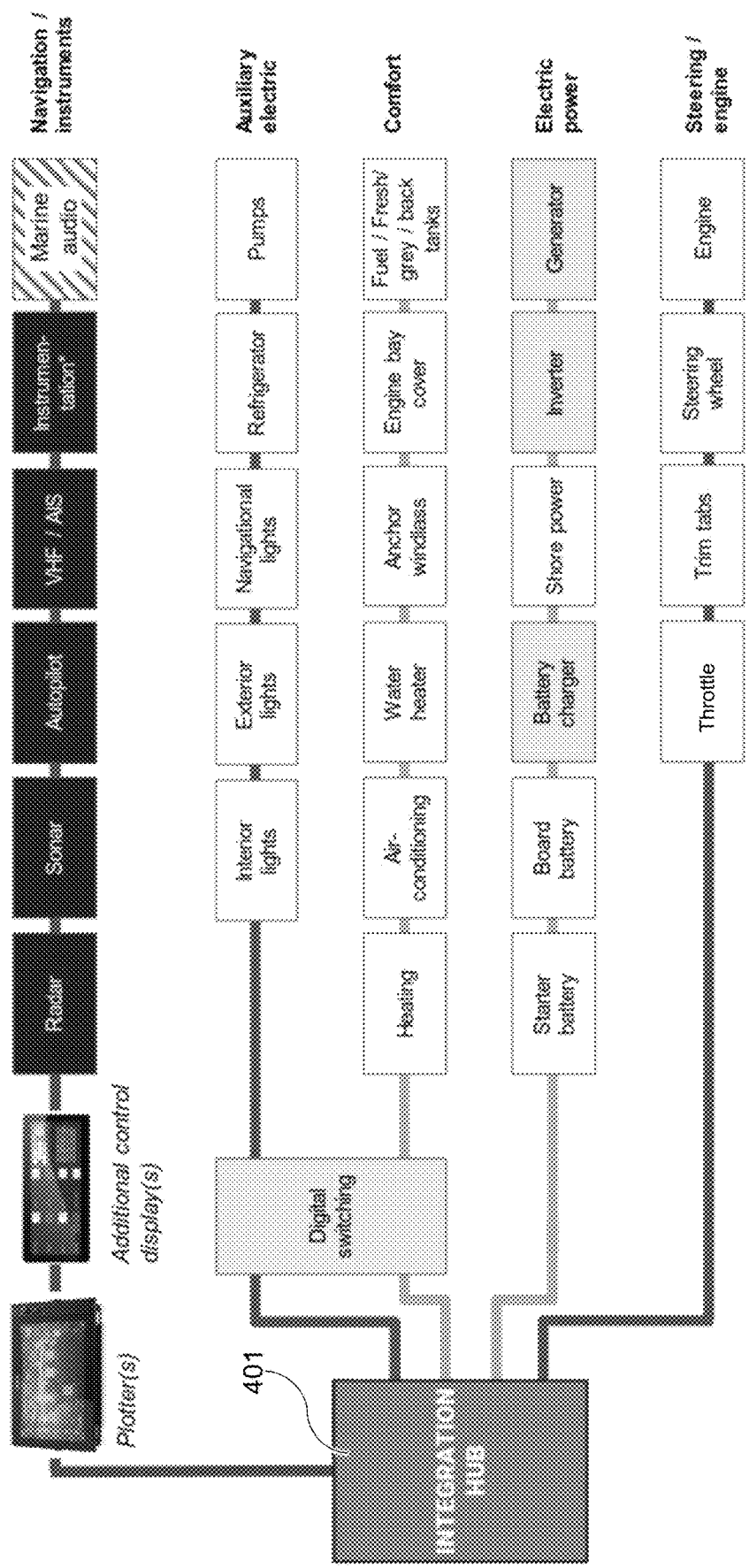
Figure 24:
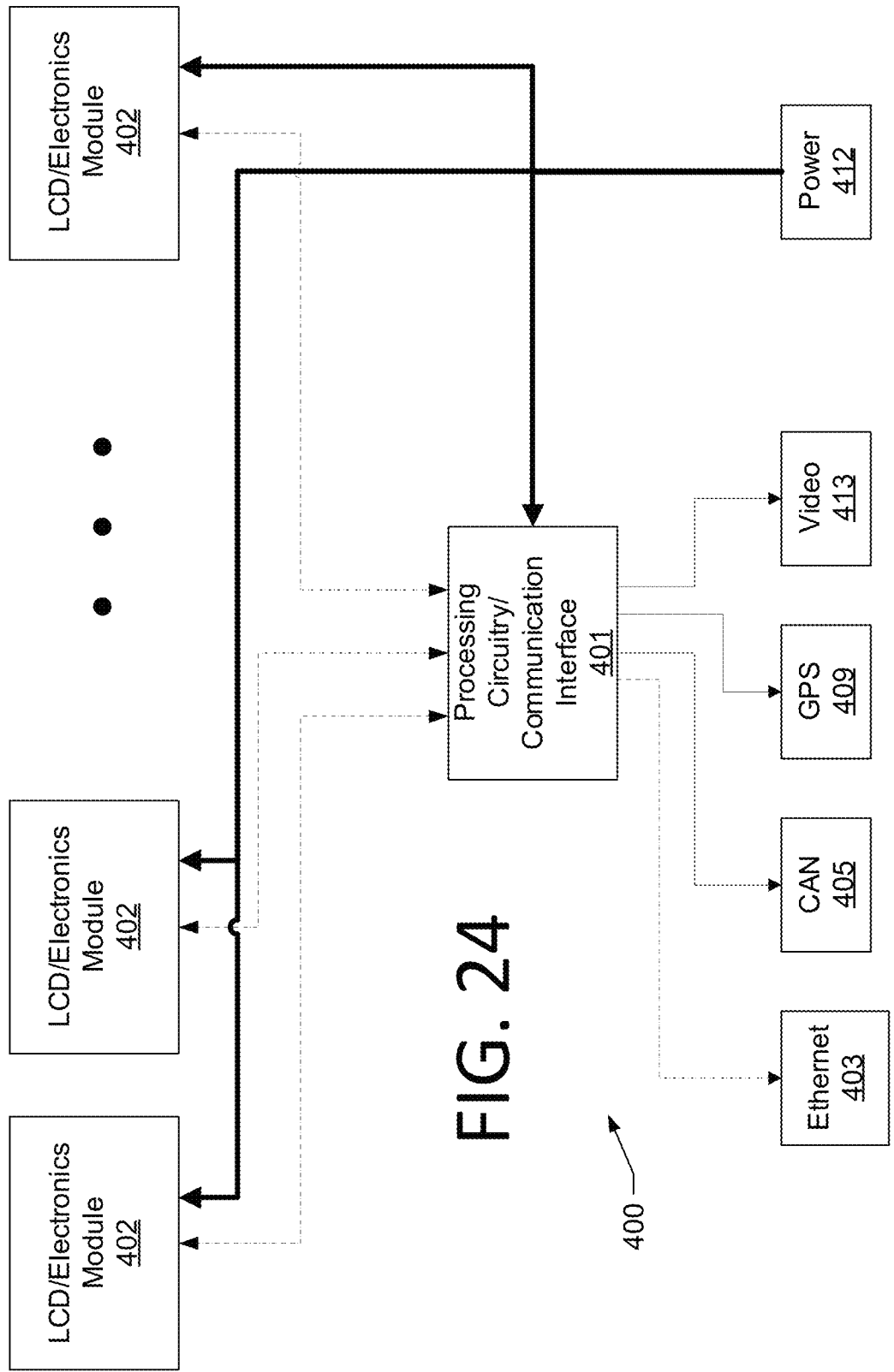
Figure 25:
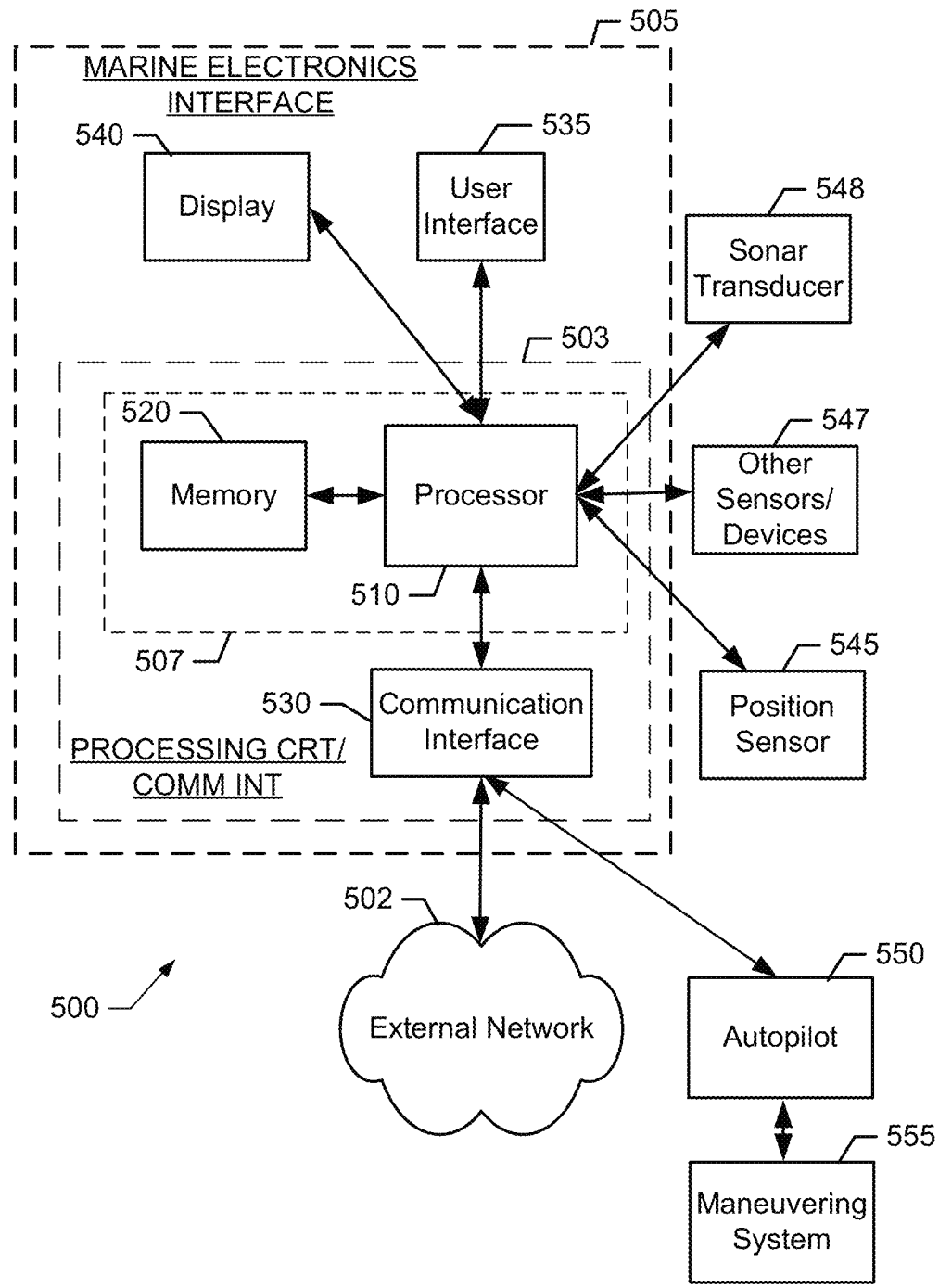
Figure 28:
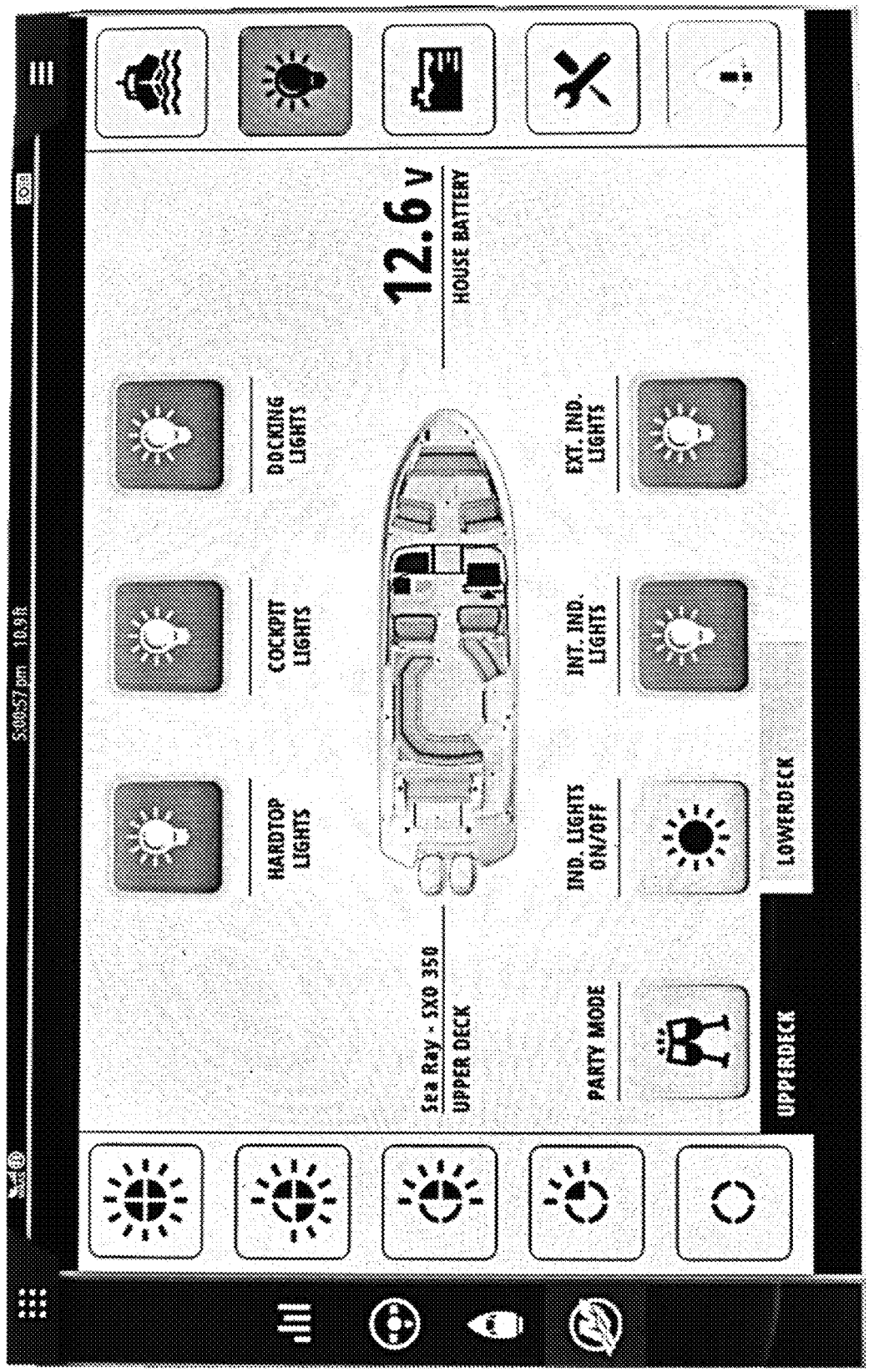
Figure 29:
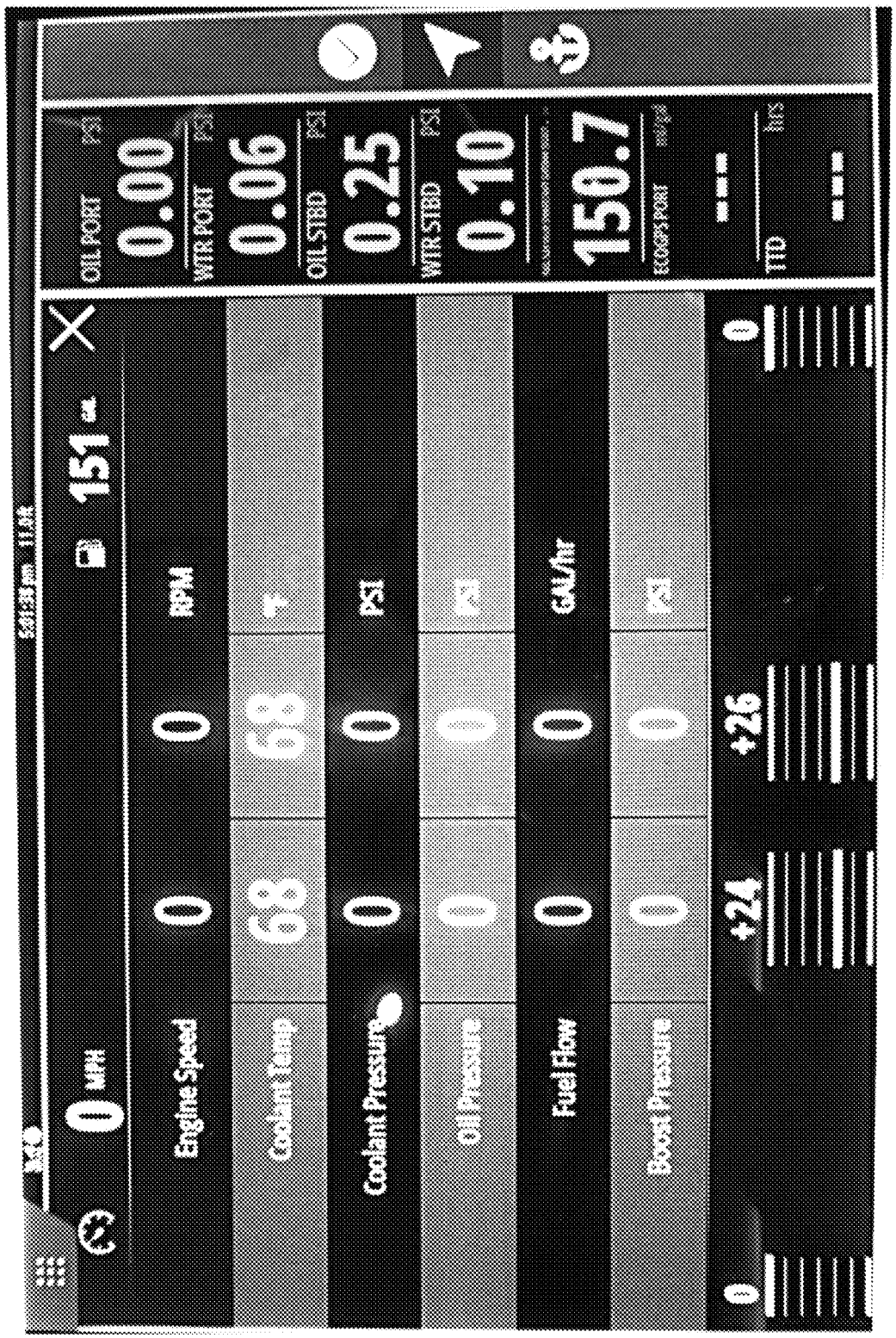
Figure 30:
Figure 31:
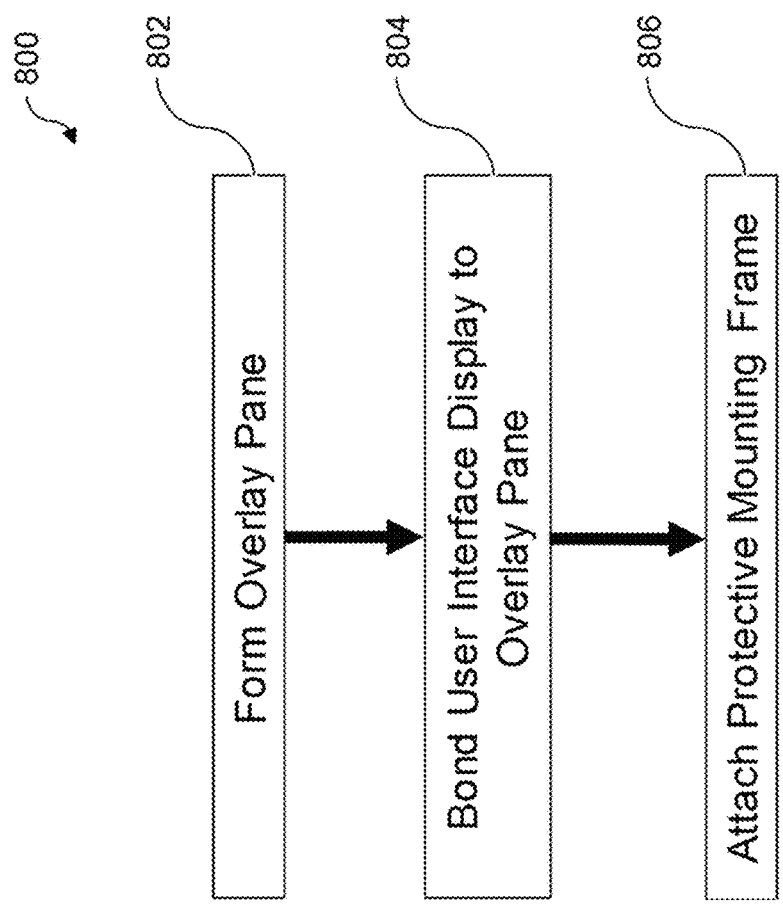

Having thus described embodiments of the present disclosure in general terms, reference will now be made to the accompanying drawings, which are not necessarily drawn to scale, and wherein:

FIG. 1 illustrates an example vessel and helm including an example bonded marine information display, in accordance with some embodiments discussed herein;

FIGS. 2A-2I illustrate various embodiments of example bonded marine information displays installed onto helms of vessels, in accordance with some embodiments discussed herein;

FIG. 3 illustrates an example marine information display installed in the helm of a vessel, in accordance with some embodiments discussed herein;

FIGS. 4A-4B illustrate example bonded marine information displays, in accordance with some embodiments discussed herein;

FIG. 5 illustrates example bonded marine information display configurations, in accordance with some embodiments discussed herein;

FIG. 6A is an exploded view of an example overlay pane and user interface displays, in accordance with some embodiments discussed herein;

FIG. 6B is an exploded view of another example overlay pane and user interface displays, in accordance with some embodiments discussed herein;

FIG. 7 is a front view of an example overlay pane, in accordance with some embodiments discussed herein;

FIG. 8 is a rear view of an example overlay pane with touch sensors, in accordance with some embodiments discussed herein;

FIG. 9 is a rear view of an example overlay pane bonded to two user interface displays, in accordance with some embodiments discussed herein;

FIG. 10A is a front view of an example overlay pane, in accordance with some embodiments discussed herein;

FIG. 10B is a rear view of an example overlay pane bonded to four user interface displays, in accordance with some embodiments discussed herein;

FIGS. 11A-11B illustrate example mounting connector configurations for user interface displays, in accordance with some embodiments discussed herein;

FIGS. 12, 13A, 13B, and 14 illustrate an example installation of a user interface display into a protective mounting frame of the bonded marine information display, in accordance with some embodiments discussed herein;

FIG. 15 is an exploded view of an example compression bracket, in accordance with some embodiments discussed herein;

FIG. 16 is a cross-sectional view of an example bonded marine information display assembly, wherein a close-up view of a portion of the example bonded marine information display assembly is also shown, in accordance with some embodiments discussed herein;

FIGS. 17A-17C are cross-sectional views of example bonded marine information display assemblies with different protective mounting frame depths, in accordance with some embodiments discussed herein;

FIG. 18 illustrates an example bonded marine information display with exposed overlay pane edges, in accordance with some embodiments discussed herein;

FIG. 19 illustrates an example bonded marine information display with recessed overlay pane edges, in accordance with some embodiments discussed herein;

FIGS. 20-21 show perspective rear views of example bonded marine information display assemblies installed into a helm on a vessel, in accordance with some embodiments discussed herein;

FIGS. 22-23 illustrate example interconnections between example bonded marine information displays and various peripheral devices, in accordance with some embodiments discussed herein;

FIG. 24 is a schematic block diagram illustrating example components for an example bonded marine information display, in accordance with some embodiments discussed herein;

FIG. 25 is a block diagram illustrating an example marine electronics system for a vessel, in accordance with some embodiments discussed herein;

FIGS. 26, 27A, 27B, and 27C are front views of various example bonded marine information displays, in accordance with some embodiments discussed herein; and FIGS. 28-30 are front views of example user interfaces showing marine data displayed on a user interface display of a bonded marine information display system, in accordance with some embodiments discussed herein; and FIG. 31 illustrates a flowchart for an example method of manufacturing a bonded marine information display, in accordance with some embodiments discussed herein.

DETAILED DESCRIPTION

Exemplary embodiments of the present disclosure will be described more fully hereinafter with reference to the accompanying drawings, in which some, but not all embodiments of the present disclosure are shown. Indeed, the present disclosure may be embodied in many different forms and should not be construed as limited to the exemplary embodiments set forth herein; rather, these embodiments are provided so that this disclosure will satisfy applicable legal requirements. Like reference numerals refer to like elements throughout.

FIG. 1 illustrates example marine vessel 100 and helm 102 including an example bonded marine information display 104, in accordance with some embodiments discussed herein. The vessel 100 may be any watercraft configured to traverse a body of water either surfaced or submerged. The vessel may include one or more helms 102 as the designated locations configured to control one or more operations of the vessel 100, including, but not limited to, propulsion, maneuvering, sonar, radar, rigging, navigation, and communications. The helm 102 may include analog and/or digital displays configured to provide information related to one or more vessel operations (e.g., speed, heading, trim depth) and/or to the status of one or more vessel components (e.g., engines, rudder or planes angles, trim tanks, ballast tanks, fuel tanks, pumps, trolling motor, sonar, radar, radios, auxiliary equipment). In an example embodiment, one or more of the displays may be unified in a bonded marine information display 104, such as described in further detail below. The bonded marine information display 104 may be supplied to a watercraft manufacturer (e.g., builder) as a single dashboard assembly to install into the helm 102 of a vessel 100. Alternatively, in some embodiments, a bonded marine information display 104 may be installed in locations other than the helm 102 of a vessel 100.

Embodiments of the bonded information display are not limited to installation in marine vessels and may be configured for installation in other vessels, vehicles, etc. and/or as a standalone display. For example, in some embodiments, the bonded information display may be used in an automobile and/or other vehicle. As another example, in some embodiments, the bonded information display may be used in a laboratory, plant, factory, and/or testing environment to display information to a user. In other embodiments, the bonded information display may be installed and/or used with machinery or other equipment.

In some embodiments, the bonded marine information display 104 may include one or more user interface displays 106, such as touchscreen displays. The user interface displays 106 may be configured to provide data associated with the vessel, such as vessel operations and component status. The user interface displays 106 may operate as marine electronic displays, such as marine multi-functional displays, known in the art, to integrate sonar, radar, autopilot, etc. In some embodiments, the bonded marine information display 104 may include two or more user interface displays 106 that may be integrated to communicate data and/or user interface input between the two or more user interface displays 106.

The bonded marine information display 104 may include an overlay pane 416, as seen best in the exploded view of FIG. 6A, bonded to the one or more user interface displays 106. The overlay pane 416 may be formed from glass, polycarbonate, or other suitable material. For example, in some embodiments, the overlay pane 416 may be made from any optically transparent materials. Utilizing an overlay pane 416 formed from polycarbonate may enable a high degree of customization of the outer periphery 202 of the bonded marine information display (such as shown in FIGS. 4A and 4B). In some embodiments, the overlay pane 416 may include indicia 206 such as branding artwork and/or labels. The indicia 206 may be silk-screened or screen printed, such as by a frit or other suitable method. In some embodiments, the bonded marine information display 104 may also include other instruments (e.g., analog gauges, meters, speakers, vents) such that may be mounted in bore holes either milled or drilled into the overlay pane 416. Alternatively, the other instruments may be similarly bonded to the overlay pane 416 or may be mounted underneath the overlay pane 416 and otherwise secured to the dashboard assembly of the bonded marine information display 104.

FIGS. 2A-2I show various example bonded marine information displays 104 installed onto helms 102 of vessels. The bonded marine information displays 104 may have a single continuous surface along a front face of an overlay pane and include a custom layout of one or more user interface displays 106 (e.g., 106a, 106b, etc.), analog displays, gauges, and/or bore holes for mounting other utilities. The user interface displays 106 may be bonded to the overlay pane within the bonded marine information display 104 to unify the displays with the overlay pane in order to create a one-piece dashboard assembly for installation into the vessel, as discussed in further detail below.

Figure 2D:
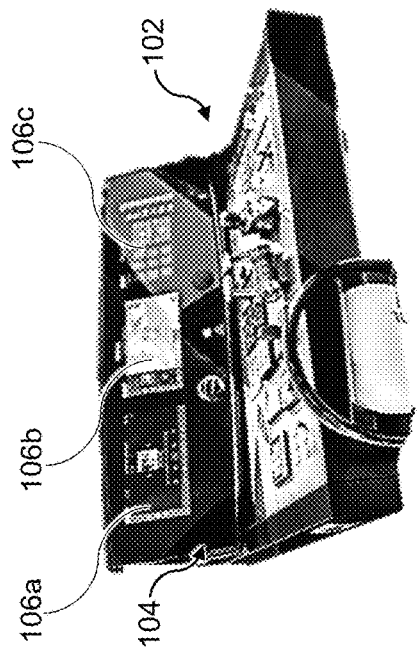
Figure 2E:
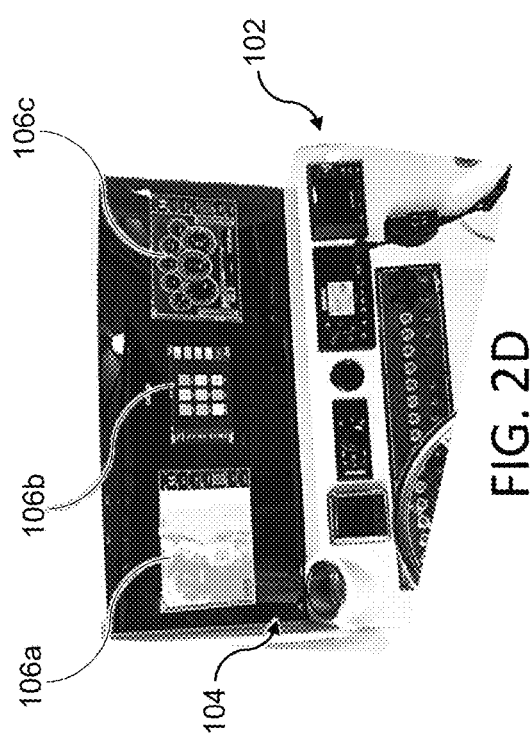
Figure 2F:
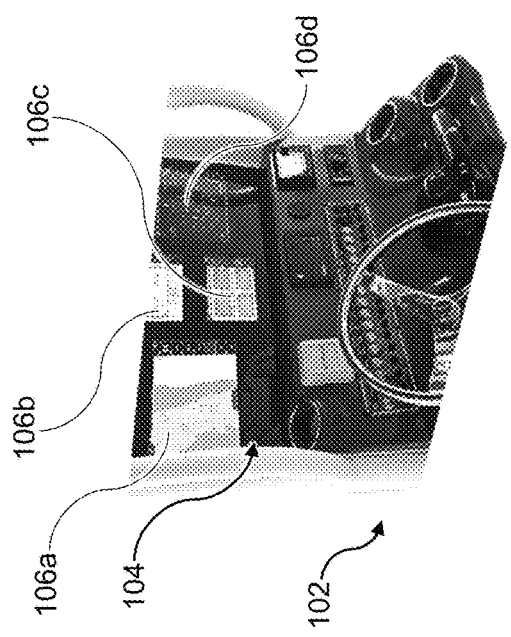
Figure 2H:
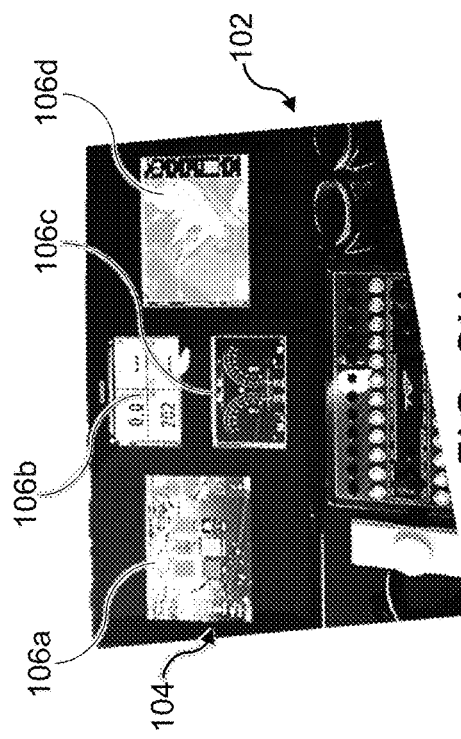
Figure 2G:
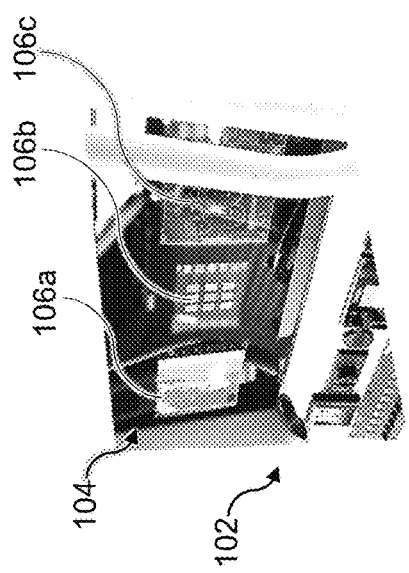
Figure 2I:
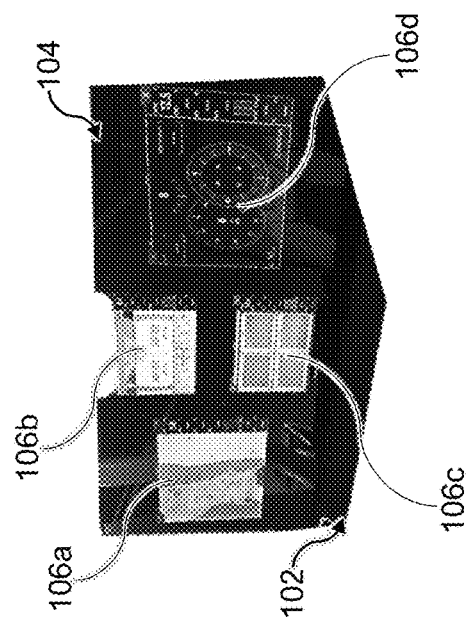

FIG. 2A shows a helm 102 with a bonded marine information display 104 installed featuring one super-wide user interface display 106. FIG. 2B shows a helm 102 with a bonded marine information display 104 installed featuring two user interface displays 106a, 106b of the same size. FIG. 2C shows a helm 102 with a bonded marine information display 104 installed featuring four user interface displays 106a, 106b, 106c, 106d, where two of the user interface displays 106a, 106d are larger and the same size, and the other two user interface displays 106b, 106c are smaller, the same size, and centrally located within the bonded marine information display 104. FIG. 2D shows a helm 102 with a bonded marine information display 104 installed featuring three user interface displays 106a, 106b, 106c, where two of the user interface displays 106a, 106c are larger and the same size, and the other user interface display 106b is smaller and centrally located within the bonded marine information display 104. FIG. 2E shows a helm 102 with a bonded marine information display 104 installed featuring three user interface displays 106a, 106b, 106c of the same size as well as bore holes formed into the lower front face of the bonded marine information display 104. FIG. 2F shows a different angle of the helm 102 and bonded marine information display 104 of FIG. 2C. FIG. 2G shows a different angle of the helm 102 and bonded marine information display 104 of FIG. 2D. FIG. 2H shows a helm 102 with a bonded marine information display 104 installed featuring four user interface displays 106a, 106b, 106c, 106d, where two of the user interface displays 106a, 106d are larger and the same size, and the other two user interface displays 106b, 106c are smaller, the same size, and centrally located within the bonded marine information display 104. FIG. 2I shows a closer view and different angle of the bonded marine information display 104 installed on the helm 102 of FIGS. 2C and 2F. Other layouts and configurations of the user interface displays 106 and bonded marine information displays 104 are possible, such as illustrated and described further with respect to FIG. 5.

FIG. 3 shows an example bonded marine information display 104 installed in a backboard 122 of the helm 102 of a vessel. In some embodiments, the width 114 of the bonded marine information display 104 may span across substantially the entire width 112 of the helm backboard 122. The periphery shape of the bonded marine information display 104 may complement the shape and contour of the helm 102 and/or the helm backboard 122. In some embodiments, the width 114 of the periphery shape of the overlay pane may extend beyond the width 116 of the user interface display 204a.

FIGS. 4A and 4B illustrate example bonded marine information displays 200, in accordance with some embodiments discussed herein. The bonded marine information display may have a rectangular periphery 202A, as depicted in FIG. 4A, or may have a custom-shaped periphery 202B, as depicted in FIG. 4B. The custom-shaped periphery may be formed in any shape to facilitate installation into any helm 102 or other location on a vessel. In addition to the periphery customization, the bonded marine information displays may have curvatures, bends, and/or other topographies in the depth dimension or z-axis to provide even greater form fitting opportunities. For example, the overlay pane may include a 90° or other bend near the center of the bonded marine information display that provides a user with two or more user interface displays oriented at 90° to each other. This example configuration may allow the user to see more detailed information with a head turn or glance, rather than having to move laterally to be closer to another screen. This example configuration may also provide space-saving opportunities to the watercraft manufacturer.

FIG. 5 illustrates example bonded marine information displays 300 in various layouts and configurations, in accordance with some embodiments discussed herein. The bonded marine information displays 300 may include one or more user interface displays 302 of one or more sizes including, but not limited to 5 inches, 7 inches, 9 inches, 12 inches, or other sizes. As depicted, the bonded marine information displays 300 may include two or more of the same size user interface displays 302, different size user interface displays 302, centered user interface displays 302, offset user interface displays, or any other configuration. The bonded marine information display 300 may include one or more mechanical elements to retain electronics, such as the user interface displays 302 and provide some environmental protection, such as IPX2 water resistance for a back side of the bonded marine information display and IPX6 water resistance for a front side. In some embodiments, the bonded marine information display 300 may include one or more mechanical strengthening elements, such as where the bonded marine information display 300 is relatively large.

FIG. 6A shows an exploded view of an example overlay pane 416 and user interface displays 204. The overlay pane 416 may be optical grade float glass, for example, able to withstand an IK07 impact test. The overlay pane 416 may be silk-screened with black in regions 616 of the information display layout without user interface displays 204 or other instruments, as shown in FIG. 7. The silk-screen material may be ceramic frit, which is then oven-cured. A logo 206 and/or other indicia may be etched out of the silk-screened area and printed with white and/or other contrasting ink. The printed ink may be UV, salt, and fog resistant (e.g., ISO 4892-2, ASTM B117), bear appropriate adhesive properties (e.g., ASTM D3359), as well as resilient to environmental temperature cycling (e.g., −40° C.-85° C.). Ink may be additionally printed on the rear side of the black silk-screened areas 616 in order to indicate the alignment of the user interface displays 204 in the particular layout, as shown in FIG. 8.

The overlay pane 416 may include a front face 416a and a rear face 416b. The user interface display 204 may include a front face (e.g., front face 204a shown in FIG. 16) that may correspond with a screen of the user interface display 204. To form the bonded marine information display, the front face of the user interface display 204 may be bonded to the rear face 416b of the overlay pane 416, such as described herein. When formed, the screen of the user interface display 204 may be visible through corresponding portion of the overlay pane 416.

In some embodiments, a protective film 618 may be laminated to the rear face of the overlay pane 416 to strengthen the overlay pane 416 and provide safety in the event of breakage. The transparent protective film 618 may be about 0.508 mm thick, for example, UV-stabilized with a matte finish, and be adhered using 5 mil adhesive transfer tape.

In some embodiments of the bonding process for manufacturing the bonded marine information displays 300, a touch capacitive sensor 620 is bonded to the overlay pane 416, and an LCD/LED/OLED screen 622 is then bonded to that. Appropriate wiring may be connected to the touch capacitive sensor 620 and LCD/LED/OLED screen 622.

Finally, a display housing 624 of the user interface display 204 may be connected and bonded.

In some embodiments, as shown in the exploded view of an example overlay pane 416 and user interface displays 204 of FIG. 6B, the display housing 624 may be assembled using a display housing front portion 624a and a display housing rear portion 624b. The display housing front portion 624a may be bonded to the rear face 416b of the overlay pane 416. Wiring and other electronics (e.g., processor, data and power ports/interfaces, printed circuit board) may be included in and/or inserted into the display housing front portion 624a. Additionally or alternatively, the wiring and/or electronics may be included in and/or inserted into the display housing rear portion 624b. Finally, the display housing rear portion 624b may be connected and/or sealed to the display housing front portion 624a.

The bonding process for manufacturing the bonded marine information displays 300 may allow multiple displays or other instruments to be mounted to the overlay pane 416 according to various layouts. The multi-instrument mounting may be enabled by using a universal positioning jig for aligning the displays and/or other instruments to a pre-determined information display layout. Optical clear adhesives and/or resins, for example, may be used for any of the bonding steps in the manufacturing process.

FIGS. 9 and 10B show rear views of user interface displays 204 bonded to overlay panes 416, in accordance with some embodiments discussed herein. As seen in FIG. 9, the user interface displays 204 may include one or more mounting connectors 404 disposed on a back side of the display housing 624 of each of the user interface displays 204. The mounting connections may include a threaded aperture or any other suitable connector. In some embodiments, the mounting connectors may be portions of the housing of the user interface displays that are configured to receive a corresponding compression bracket (as described herein) and, in some cases, may not necessarily include a specific structural connection feature.

FIGS. 11A and 11B illustrate example mounting connector 404 configurations for user interface displays 204, in accordance with some embodiments discussed herein. FIG. 11A depicts a first mounting connector configuration including a mounting connector 404 disposed proximate to each corner of the back side of the user interface display 204. FIG. 11B depicts a second mounting connector configuration including two mounting connectors 404 disposed proximate to, and offset from, each corner of the back side of the display housing 624 of the user interface display 204. A power connector 410 may be disposed on the back side of the display housing 624 of the user interface display 204. Additionally, one or more data connectors 411, such as Ethernet connections, may be disposed on the back side of the display housing 624 of the user interface display 204.

A compression bracket 406 may be connected to one or more of the mounting connectors 404 to utilize the bonded user interface display 204 to press a protective mounting frame 408 against the overlay pane 416, as discussed below in reference to FIGS. 12-14.

Figure 12:
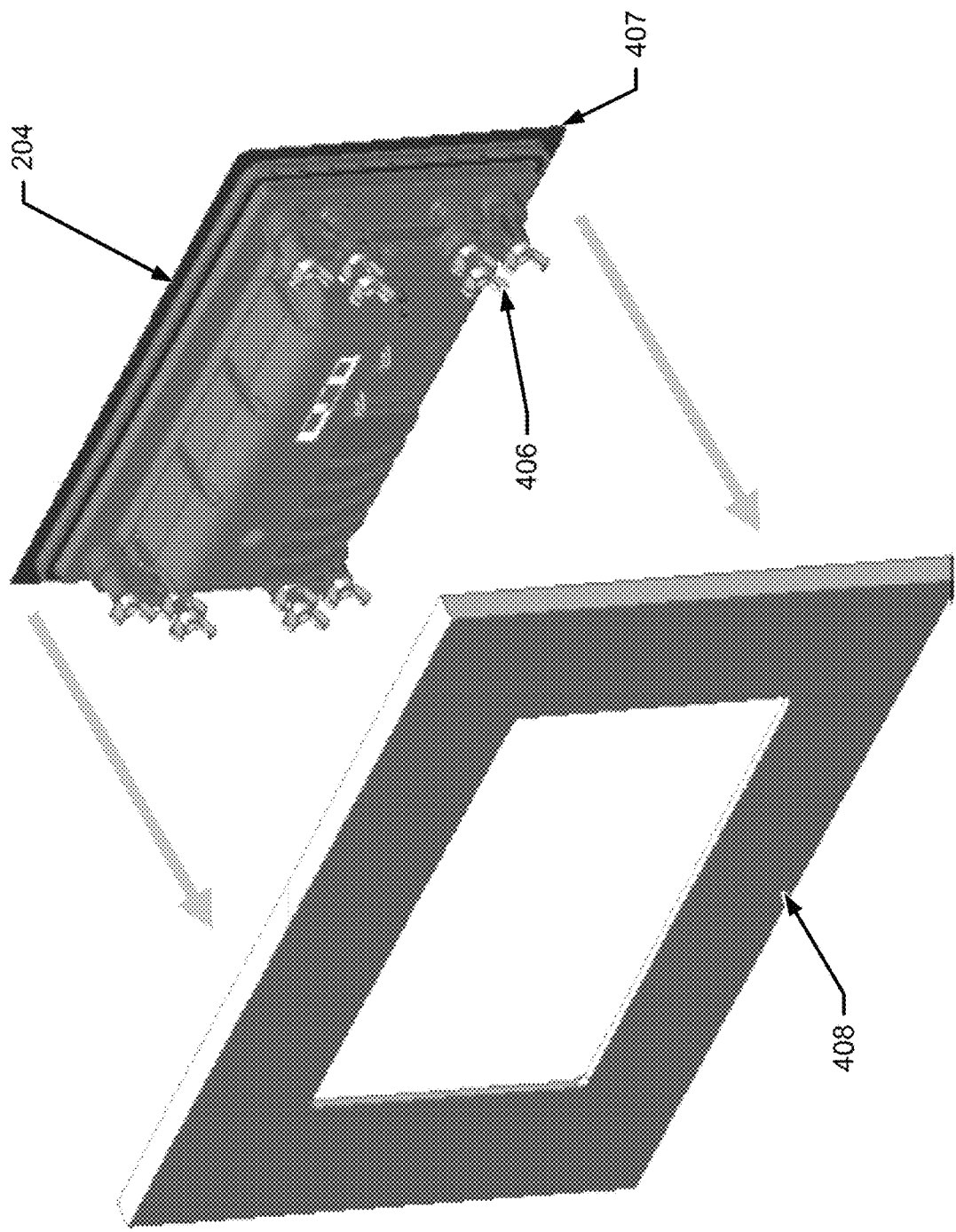
Figure 14:
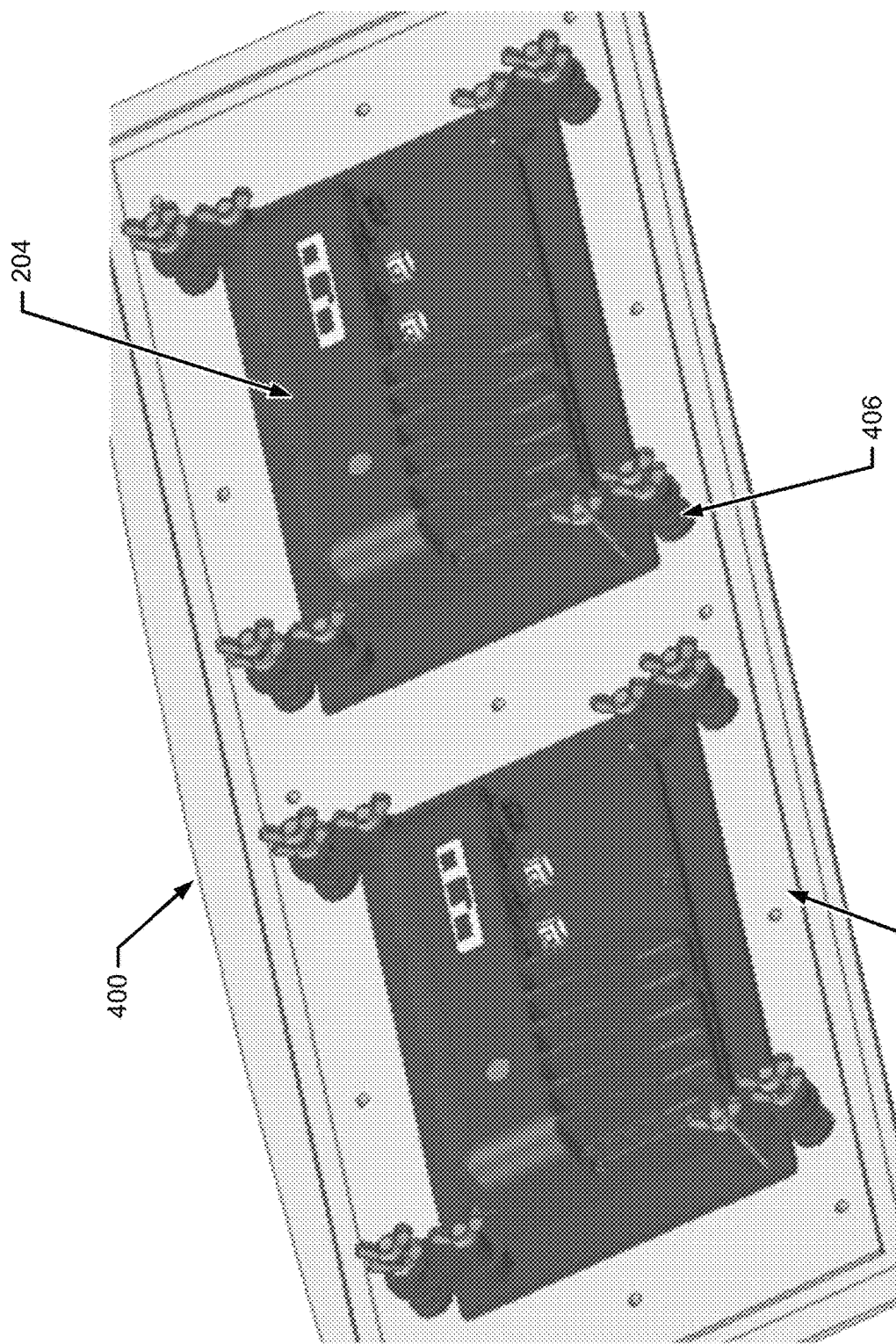

FIGS. 12-14 illustrate an example installation of a user interface display 204 into a protective mounting frame 408 of the bonded marine information display, in accordance with some embodiments discussed herein. As depicted in FIG. 12, the back side of the display housing 624 of the user interface display 204 may be inserted through the protective mounting frame 408. The user interface display 204 may include a retention lip 407 configured to be larger than the aperture in the protective mounting frame 408, thus preventing a front side of the display housing 624 of the user interface display 204 from passing through the protective mounting frame 408.

One or more compression brackets 406 may be installed in one or more mounting connectors 404 on the back side of the display housing 624 of the user interface display 204. The compression brackets 406 may be configured to be pivot about the mounting connectors 404. The compression brackets 406 may be oriented in an installation position, as shown in FIG. 13A. In the installation position, the compression brackets 406 may not extend into the area defined by the retention lip 407, such that the back side of the display housing 624 of the user interface display 204 may pass through the protective mounting frame 408 unobstructed by the compression brackets 406. Once the one or more user interface displays 204 are inserted into the protective mounting frame 408, such that the retention lip 407 abuts the protective mounting frame 408, the one or more compression brackets 406 may be rotated or pivoted into a capture position. In the capture position, a portion of the protective mounting frame 408 may be disposed between the retention lip 407 and a portion of the compression brackets 406, as shown in FIGS. 13B and 14.

FIG. 15 illustrates an exploded view of a compression bracket 406, in accordance with some embodiments discussed herein. The compression bracket 406 may include a bracket body 420 including a connector 422. In the depicted example, the connector 422 comprises a screw (e.g., a wing nut screw) including threads complementary to the mounting connectors 404 in the user interface display 204. Although not shown, the connector 422 may also include a washer or other appropriate connection adapter, such as to prevent or minimize any deformation to the bracket body 420 during assembly. The bracket body 420 may include a connector aperture 424 configured to accept the connector 422 therethrough. In some embodiments, the compression bracket 406 may include a biasing element 425, such as a coil spring, for example, disposed between a head of the connector 422 and the bracket body 420 and configured to bias the bracket body 420 toward the back side of the display housing 624 of the user interface display 204, to limit rotation of the bracket body 420 during installation of the user interface display 204 into the protective mounting frame 408, prior to tightening the connector 422. In some embodiments, the bracket body 420 may include one or more detents 426 disposed on a surface facing the back side of the display housing 624 of the user interface display 204 to further increase the resistance to rotation during installation of the one or more user interface displays 204 into the protective mounting frame 408. Additionally, in some embodiments, the back side of the display housing 624 of the user interface display 204 may include one or more complementary grooves, such as grooves at 90 degrees, for example, to accept the detents 426.

In some embodiments, the protective mounting frame 408 may include a display recess 415 complementary to the retention lip 407 of the user interface display 204. As shown in FIG. 16, a seal 418, such as a foam, rubber, and/or silicone seal, for example, may be disposed between the retention lip 407 and the display recess 415 to provide a barrier to particles and/or water entry. The compression bracket 406 may include a compression element configured to exert a pressure on the back side of the protective mounting frame 408, which in turn applies pressure between the retention lip 407 and the display recess 415. This mounting arrangement may enable the use of smaller sized overlay panes 416. The mounting arrangement may also be service-friendly, in that the user interface displays 204 may be relatively easy to remove by loosening the compression brackets 406. The seal 418 may be decompressed and recompressed without replacement, unlike an adhesive seal.

As discussed above, the compression bracket 406 may also include a compression element 427 configured to apply pressure to a back side of the protective mounting frame 408. The compression element 427 may include a threaded screw 428 (e.g., a wing screw) configured to engage complementary threads disposed in a compression aperture 423 in the bracket body 420. Rotation of the threaded screw 428, in a tightening direction may cause a distal end of the threaded screw 428 to extend through and away from the bracket body 420 toward the back side of the protective mounting frame 408. The distal end of the threaded screw 428 may engage the back side of the protective mounting frame 408 and exert force thereon, which in turn may cause a force to be between the retention lip 407 and the display recess 415. In some embodiments, a foot, or boot 430 may be disposed on the distal end of the threaded screw 428. The boot 430 may increase the surface area of the distal end of the threaded screw 428 and have a relatively smooth surface to prevent marring or damage to the back side of the protective mounting frame 408.

The compression element 427 may also include a lock 429. As shown in FIG. 15, the lock 429 may comprise a nut (e.g., wing nut) disposed on the threaded screw 428. The lock 429 may be tightened against the bracket body 420 to prevent or limit rotation of threaded screw 428, such as after installation of the user interface display 204 into the protective mounting frame 408. The lock may prevent vibrations, such as those due to operation of the vessel, from inadvertently loosening the compression element 427.

FIG. 16 shows a cross-sectional view of an example bonded marine information display 400 with one or more user interface displays 402, in accordance with some embodiments discussed herein. In some embodiments, the front face 402a of the display housing 624 of the user interface display 402 may be substantially flush with a front face 408a of the protective mounting frame 408 when the retention lip 407 is seated in the display recess 415. The overlay pane 416 may be disposed over the front face of the protective mounting frame 408 and the user interface display 402, such that the front face 402a of the user interface display 402 and the front face 408a of the protective mounting frame 408 abut a rear face 416b of the overlay pane 416. In some embodiments, the overlay pane 416 may be disposed with a clearance between the front side of the protective mounting frame 408 and the overlay pane 416, thereby limiting or preventing clamping pressure or stress from being applied to the overlay pane 416.

FIGS. 17A-17C are cross-sectional views of example bonded marine information displays with different protective mounting frame 408 depths, in accordance with some embodiments discussed herein. As depicted in FIGS. 17A-17B the compression element 427 may be tightened or loosened to accommodate protective mounting frames 408 of different depths, such as about 3 mm and about 13 mm. Additionally or alternatively, the compression brackets 406 may include bracket bodies 420 of differing sizes to accommodate a larger range of depths of protective mounting frames 408, as shown in FIG. 17C, accommodating about 12 mm to about 25.4 mm.

In some embodiments, the protective mounting frame 408 may include a mounting ring 440 disposed about the periphery of the overlay pane 416, when user interface displays 402 are installed into the protective mounting frame 408. In some embodiments, the edge of the overlay pane 416 is exposed, as depicted in FIG. 18. The exposed edge may reduce the risk of accumulation of unwanted substances, such as water, ice, dirt, and dust. Additionally, where the entirety of the edge of the overlay pane 416 is exposed, fit tolerance of the overlay pane 416 into an installed position is not a critical factor. In alternative embodiments, as shown in FIG. 19, at least a portion of the edge of the overlay pane 416 is covered, such that the overlay pane 416 is recessed into an overlay pane pocket of the protective mounting frame 408. In configurations with at least a portion of the edge of the overlay pane 416 covered, the risk of damage to the corner of the overlay pane 416 may be reduced.

FIGS. 20-21 show rear views of example bonded marine information displays 104 installed into a helm 102 on a vessel. Installation of the single information display dashboard assembly to the backboard of the helm 102 may be achieved using a mounting bracket 120 or any other suitable attachment methods. For example, the mounting bracket 120 shown in FIGS. 20-21 may utilize a screw or other connector engaged with the protective mounting frame 408 of the bonded marine information display assembly 104 and another screw or other connector engaged with the backboard of the helm. FIGS. 20-21 also show possible wiring connections to the bonded marine information display 104 and to the user interface displays 204.

FIGS. 22-24 illustrate example interconnections between the bonded marine information display and peripheral devices.

FIG. 22 is a schematic of an example integration hub 401 of the bonded marine information display 400 and its connectivity with peripheral systems. The interfacing capabilities of the integration hub may allow the bonded marine information display system to understand the data received from other systems rather than just displaying it. For example, the integration hub may be in communication with an onboard air conditioning system, and—regardless of the air conditioning manufacturer—the integration hub may identify the power (e.g., on/off) state and the temperature setting of the air conditioning system. The integration hub may include an associated application programming interface (API) that provides manufacturers the ability to access features or data of the software installed on the integration hub. Using this deep API integration functionality, the marine information display may provide a user with alerts, for example, based on the incoming data (e.g., oil pressure) from peripheral systems without the peripheral systems having to provide the alert state. As illustrated, the example integration hub 401 is connected to periphery devices such as sonar, radar, autopilot, navigation, motor controllers, and other components.

FIG. 23 is a schematic of another example integration hub 401 and its interconnectivity with other vessel systems. The integration hub may drive the displays, connect to control systems, and run operating system navigation and control software. For example, the integration hub 401 may connect to example periphery devices, such as other user interfaces/marine electronic devices, radar, sonar, navigation, autopilot, VHF/AIS, various electric-based devices/systems (e.g., lighting, refrigeration, pumps, etc.), various comfort-based devices/systems (e.g., heating, air-conditioning, water heater(s), anchor(s), cover(s), fuel and other tanks), various electric power devices/systems (e.g., starter battery, board battery, charger, shore power, inverter, generators, etc.), and/or various steering/engine devices/systems (e.g., throttle, trim tabs, steering wheel, engine, etc.). In some embodiments, digital switching may be utilized to gather data from various connected devices/systems, such as the auxiliary electric devices/systems and/or the comfort-based devices/systems.

FIG. 24 is a schematic of an example bonded marine information display 400, in accordance with some embodiments discussed herein. The bonded marine information display 400 may include one or more user interface displays 402 (e.g., LCD/LED/OLED/electronics modules), as discussed above. The user interface displays 402 may be in data communication with an integration hub, processing circuitry, or a communication interface 401, such as via Ethernet cabling (indicated in FIG. 24 by dashed lines). Alternatively, the user interface displays 402 may be in data communication with the integration hub 401 via a video only connection, HDMI connection, display port, or the like.

In some embodiments, the integration hub 401 may be separate from the user interface displays 402, however, the integration hub 401 may be disposed within one of the user interface displays 402 and/or be distributed between two or more user interface displays 402. Alternatively, the integration hub 401 may be located remotely from the bonded marine information display assembly 400. In some embodiments, the user interface displays 402 may be daisy-chained together using serially connected display ports or Ethernet connections.

In some embodiments, the integration hub 401 may include a processor 510 and a communication interface 530, as described in further detail in reference to FIG. 25. The processor 510 may be an Advanced RISC Machines (ARM) CPU, such as iMX61. The communication interface 530 may include a network connection and/or a digital display connection, such as HDMI or Display port, for example. In some embodiments, two or more user interface displays 402 may be connected to a single network connection with internal Ethernet switching. Utilizing a single network connection and Ethernet switching may allow easier integration of multiple user interface displays 402 and may require significantly less cabling.

The integration hub 401 may be in data communication with one or more peripheral components and/or networks, including but not limited to an Ethernet port 403, a computer area network (CAN) 405, a global position system (GPS) 409, and a video port 413. For example, the integration hub 401 may be configured to connect with remote controls (e.g., thumb buttons) built-in to a steering wheel on the helm to allow the user to control the operations of the vessel without having to reach over and engage a touchscreen.

In some embodiments, the bonded marine information display 400 may include a power supply 412 configured to provide electrical power to the one or more user interface displays 402 and the integration hub 401. The bonded marine information display 400 may include an Ethernet and a power cable connection that is distributed internally to the one or more user interface displays 402 and the integration hub 401.

In some embodiments, the integration hub 401 may be configured to execute computer program code, stored on a non-transitory storage medium (e.g., a memory) configured to detect a vessel type, model, and/or peripheral devices. Automatic detection may reduce configuration set-up time and management requirements.

In some embodiments, the integration hub 401 and/or one or more of the user interface displays 402 may include an accelerometer for measuring acceleration data, which may be logged by the integration hub 401. The acceleration data may be utilized for maintenance, warranties, accident investigation, and/or product data collection for quality control. In some embodiments, the bonded marine information display 400 may include an accelerometer, a gyroscope, and/or a magnetometer, which may be portions of a micro-electro-mechanical system (MEMS). In some embodiments, the accelerometer may be a variable capacitive (VC) MEMS accelerometer, a piezoresistive (PR) MEMS accelerometer, or the like. The gyroscope may be configured to measure angular velocity. In some embodiments, the gyroscope may be a vibrating structure MEMS gyroscope including gyroscopic sensors oriented in a plurality of axes. The magnetometer may be configured to measure magnetic field strength, which can be used to find magnetic north and/or heading angle. In some embodiments, the magnetometer may be a Lorentz force based MEMS sensor, electron tunneling MEMS sensor, MEMS compass, or the like.

In some embodiments, the integration hub 401 may also be configured to operate in a low power mode, such as after a predetermined operating time without a user input, for example. The low power mode may reduce the power consumption of the bonded marine information display 400 in a variety of ways, such as by lowering the brightness of one or more of the user interface displays 402, for example. The low power mode may extend running times with minimal drain to any onboard batteries of the vessel 100. Additionally or alternatively, the integration hub 401 may manage the power drain of the batteries by adjusting the ratio of the time in low power mode versus the time in full power mode.

Example System Architecture

FIG. 25 is a block diagram of an example bonded marine information display system 500, which may be used with embodiments of the present disclosure. As shown in FIG. 25, the bonded marine information display system 500 may include a plurality of different modules or components. Each different module or component may comprise any device or means embodied in either hardware, software, or a combination of hardware and software configured to perform one or more corresponding functions. For example, such as described in various embodiments herein, the bonded marine information display system 500 may include an integration hub along with a marine electronics interface 505 (and the integration hub may include various components of the illustrated marine electronics interface 505). In some embodiments, such as described in various embodiments herein, the bonded marine information display system 500 may include multiple marine electronics interfaces 505.

The marine electronics interface 505 (e.g., a user interface display) may include a processor 510, a memory 520, a user interface 535, a display 540, one or more sensors (e.g., a position sensor 545, other sensors 547, a sonar transducer 548), and a communication interface 530. The processor 510 and memory 520 may form processing circuitry 507. The processor 510 may be any means configured to execute various programmed operations or instructions stored in a memory, such as a device and/or circuitry operating in accordance with software or otherwise embodied in hardware or a combination thereof (e.g., a processor operating under software control, a processor embodied as an application specific integrated circuit (ASIC) or field programmable gate array (FPGA) specifically configured to perform the operations described herein). The processor 510 may configure the device and/or circuitry to perform the corresponding functions of the processor 510 as described herein. In this regard, the processor 510 may be configured to analyze electrical signals communicated thereto to provide, for example, route data for navigation of the vessel. In some embodiments, the processor 510 may be configured to receive route data and/or user input associated with route data to generate and/or modify a route for display to a user (e.g., on the display 540 and/or user interface 535). Additionally or alternatively, the processor 510 may be configured to generate and/or send route data including instructions to an autopilot 550 to operate a maneuvering system 555 to cause the vessel to travel along the route.

In some embodiments, the processor 510 may be further configured to implement signal processing and/or enhancement features to improve the display characteristics, data, and/or images, to collect and/or process additional data (e.g., time, temperature, GPS information, waypoint designations), and/or to filter extraneous data to better analyze the collected data. In some embodiments, the processor 510 may further implement notices and/or alarms (e.g., alerts determined or adjusted by a user) to reflect depth measurements, the presence of fish, the proximity of other watercraft, status or notifications for peripheral devices/systems, etc.

The memory 520 may be configured to store instructions, computer program code, marine data (e.g., sonar data, chart data, location/position data), and/or other data associated with the bonded marine information display system 500 in a non-transitory computer readable medium for use by the processor, for example. In some embodiments, the bonded marine information display system 500 may include several types of memory, such as random access memory (RAM), flash or other electrically erasable programmable read-only memory (EEPROM), embedded Multi-Media Controller (eMMC) memory, etc.

The marine electronics interface 505 may also include one or more communication interfaces 530 configured to communicate via any of many known manners, such as via a network, for example. The processing circuitry 507 and communication interface 530 may form a processing circuitry/communication interface 503, which may be similar to the integration hub/processing circuitry/communication interface 401 discussed above with reference to FIG. 24. The communication interface 530 may include one or more of a plurality of different communication backbones or frameworks, such as Ethernet, USB, CAN, NMEA 2000, GPS, Sonar, cellular, WiFi, and/or other suitable networks, for example. The communication interface 530 may be configured to enable connections to external systems (e.g., an external network 502). In this manner, the marine electronics interface 505 may retrieve stored data from a remote, external server via the external network 502 in addition to or as an alternative to the onboard memory 520. The external network 502 may support other data sources, such as GPS, autopilot, engine data, compass, radar, etc.

The position sensor 545 may be configured to determine the current position and/or location of the marine electronics interface 505. For example, the position sensor 545 may comprise a GPS, bottom contour, inertial display, such as a micro-electro-mechanical system (MEMS) sensor, a ring laser gyroscope, and/or other location detection system.

The display 540 may be configured to display images and may include or otherwise be in communication with a user interface 535 configured to receive input from a user. The display 540 may be, for example, a conventional liquid crystal display (LCD), LED/OLED display, touchscreen display, mobile device, and/or any other suitable display known in the art, upon which images may be displayed.

In some embodiments, the display 540 may present one or more sets of marine data and/or images generated therefrom, as shown in FIGS. 28-30. Such marine data may include chart data, radar data, weather data, location data, position data, orientation data, sonar data, and/or any other type of information relevant to the vessel. In some embodiments, the display 540 may be configured to present marine data simultaneously as one or more layers and/or in split-screen mode. In some embodiments, the user may select various combinations of the marine data for display. In other embodiments, various sets of marine data may be superimposed or overlaid onto one another. For example, a route may be applied to (or overlaid onto) a chart (e.g., a map or navigation chart). Additionally or alternatively, depth information, weather information, radar information, sonar information, and/or any other display inputs may be applied to and/or overlaid onto one another.

The user interface 535 may include, for example, a keyboard, keypad, function keys, mouse, scrolling device, input/output ports, touch screen, and/or any other mechanism by which a user may interface with the bonded marine information display system 500.

Although the display 540 of FIG. 25 is shown as being directly connected to the processor 510 within the marine electronics interface 505, in some embodiments, the display 540 may be located remotely from the processor 510 and/or marine electronics interface 505. Likewise, in some embodiments, the position sensor 545 and/or user interface 535 may be located remotely from the marine electronics interface 505. Similarly, the autopilot 550 is depicted in FIG. 25 as remote from the marine electronics interface 505, but may be directly connected to the processor 510 within the marine electronics interface 505.

The marine electronics interface 505 may include one or more other sensors 547 (e.g., an air temperature sensor, a water temperature sensor, a current sensor, a light sensor, a wind sensor, a speed sensor) configured to measure environmental condition parameters.

In some embodiments, the sonar transducer 548 may be castable or housed in a trolling motor housing attached to the vessel. The sonar transducer 548 may be configured to gather sonar data (e.g., sonar returns) from the underwater environment relative to the vessel. Accordingly, the processor 510 may be configured to receive the sonar data from the sonar transducer 548 and process the sonar data to generate an image including a sonar image based on the gathered sonar data. In some embodiments, the marine electronics interface 505 may be used to determine depth and bottom contours, detect fish, locate wreckage, etc. Sonar signals, beams, and/or pulses from the sonar transducer 548 may be transmitted into the underwater environment, reflect off objects (e.g., fish, structures, sea floor bottom), and return to the transducer assembly, which converts the sonar returns into sonar data, which may be used to produce an image of the underwater environment.

In some embodiments, the autopilot 550 may include processing circuitry, such as a processor and a memory, for example, configured to operate the maneuvering system 555. The autopilot 550 may be configured to operate the maneuvering system automatically (e.g., without user interaction) causing the vessel to travel along the navigable route. The autopilot 550 may generate instructions to operate the maneuvering system 555 based on a vessel position, the navigable route, and/or the like. The maneuvering system 555 may include one or more propulsion motors or engines, such as outboard motors, inboard motors, trolling motors, main engines, and/or emergency propulsion motors, for example. Additionally, the maneuvering system 555 may include one or more control surfaces (e.g., rudders, planes) configured to steer the vessel.

Example Operations

Embodiments of the present invention provide methods for receiving, processing, and/or displaying marine data. Various examples of the operations performed in accordance with embodiments of the present disclosure will now be provided with reference to FIGS. 26-30.

Figure 26:
Figure 27A:
Figure 27B:
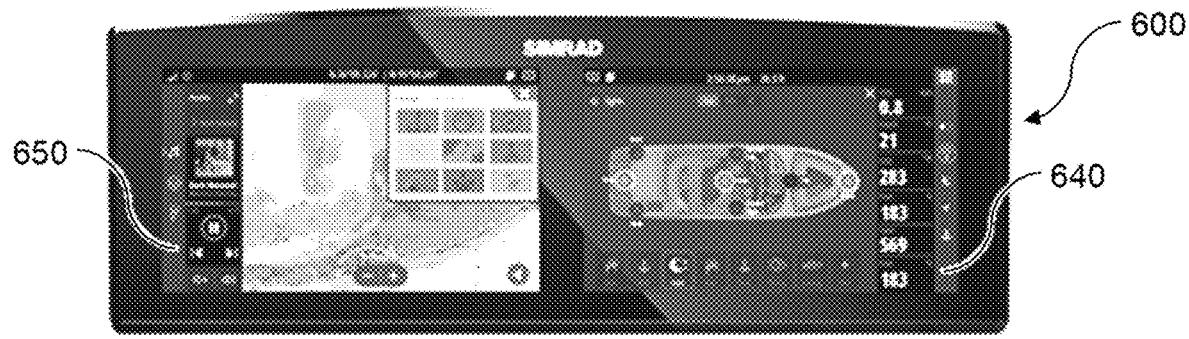
Figure 27C:

FIG. 26 shows an example bonded marine information display system 600 with a custom-shaped periphery and two user interface displays. Depicted on the user interface display screens is a customized user interface. A watercraft builder may customize the design and menus of the user interface via the software configured in the bonded marine information display system 600.

In some embodiments, the software may include a boat personality file or profile defined for the network of one or more displays and an integration hub of the bonded marine information display system 600. The configuration for the vessel may be loaded onto the integration hub. The boat profile may be generated by the watercraft builder to be unique to a series or specific model of vessel. Additionally or alternatively, the boat profile may be specific to a particular installation. The boat profile may define the number of user interface displays on the network, orientations of the user interface displays (e.g., right-hand, middle, left-hand), predefined activities accessible from an activity bar, and/or the software update process.

In some embodiments, the user interface may be experience-based and include a control bar 640 along the edge of one user interface display screen and an activity bar 650 along the edge of another user interface display screen. The control bar 640 may allow the user to control the contextual or situational mode of the user interface. Changing the situational mode on the control bar 640 on one screen may cause one or more user interface displays to display predefined user interface screens that correlate with the situational mode by displaying all the relevant data for the selected boating situation. In addition to changing the graphical user interface display, selecting a particular situational mode may automatically trigger operational actions on the vessel itself (e.g., starting an engine or generator, powering on radar or lights). The software may allow one or more customized modes to be configured by the user or watercraft builder to best visually communicate the utilities of a specific vessel or the user's preferred data at any moment in time.

In some embodiments, the situational modes may include a prepare mode, a cruise mode, an anchor mode, and/or a water sports mode. The prepare mode may allow the user to easily check all the systems in the vessel, such as by using digital switches and level indicators, for example. The cruise mode may display only the critical information on the user interface display screens, thus not distracting the user with extraneous data. For example, in cruise mode, one screen may be designated as a navigation display (e.g., showing a full screen navigational chart, map overlays, auto-routing/pilot, etc. with split-screen options), while another screen may be designated as a vessel information display (e.g., showing critical vessel data, digital switches, gauges, audio control, etc.). The anchor mode may cause the user interface displays to display all the relevant controls and alarms at once, allowing the user to more easily anchor the vessel. The water sports mode may integrate a rear view camera display on the user interface display screens along with relevant charts to allow the user to keep an eye on a skier, for example, while navigating. The bonded marine information display system software may include a dockside mode, which displays controls related to the thermostat, stereo, fresh water pump, etc. The bonded marine information display system software may include an underway mode, which when selected turns on the radar, starts the generator, and displays controls related to the radar, chart, engine gauges, navigation lights, etc. Many more modes are possible (e.g., system check, store display) and may depend on the utilities and peripherals of the particular vessel.

The bonded marine information display system 600 may start-up in a particular situational mode to allow the user to see the most relevant data and controls before operation of the vessel. In some embodiments, some situational modes may be automatically triggered by sensors or other data received by the bonded marine information display system 600, such that the user does not have to manually select to change modes.

The software update process may be managed by the integration hub. In some embodiments, the integration hub may inform the user on one or more user interface displays that the software update process will commence, the status/progress of the update, and/or the implications of the update process. The integration hub may update every element of the bonded marine information display system 600. The integration hub may be configured to detects errors and/or other failures and to perform rollbacks accordingly.

In some embodiments, the integration hub may include a Bluetooth proxy. The user interface displays may utilize the Bluetooth proxy to give the appearance that each user interface display has its own Bluetooth, while actually sharing the same Bluetooth physical interface. In some embodiments, a user may control a cursor that spans across multiple user interface display screens.

Embodiments of the bonded marine information display provided herein provide customizable options for modern, consistent, and attractive industrial design for any vessel. The bonded marine information display dashboard assemblies provide flexibility through configurable periphery contours, layouts, and user interface software designs, which may enable watercraft builders to differentiate their brands of vessels while still remaining cost-effective. The disclosed bonded marine information display systems may also enable integration of functions of helms previously performed by multiple separate components into a single component and reduction of costs by avoiding unnecessary expenses, such as waterproofing.

Example Flowchart(s)

Embodiments of the present invention provide methods for manufacturing example bonded marine information displays, such as described herein. Various examples of the operations performed in accordance with some embodiments of the present invention will now be provided with reference to FIG. 31.

FIG. 31 illustrates a flowchart according to an example method for manufacturing an example bonded marine information display according to an example embodiment. The method 800 may include forming an overlay pane, such as according to a periphery shape at operation 802. At operation 804, the method comprises bonding the front face of one or more user interface displays to the rear face of the overlay pane. In some cases, intermediary surfaces can be positioned between the two faces, such as protective laminate or other layers. Example bonding agents include optical clear adhesive and resin. In some embodiments, such as illustrated in FIG. 6A, the touch sensor can be bonded to the rear face of the overlay pane, then the screen of the user interface display can be bonded to the touch sensor, and the housing for the user interface display can then be attached. At operation 806, the protective mounting frame can be positioned around the user interface displays. In some embodiments, mounting features, such as compression brackets can be used to hold the protective mounting frame in place, such as abutting the rear face of the overlay pane. In some embodiments, the method further comprises attaching the now single-piece bonded marine information display to a marine vessel.

CONCLUSION

Many modifications and other embodiments of the disclosures set forth herein will come to mind to one skilled in the art to which these present disclosures pertain having the benefit of the teachings presented in the foregoing descriptions and the associated drawings. Therefore, it is to be understood that the embodiments of the present disclosure are not to be limited to the specific embodiments disclosed and that modifications and other embodiments are intended to be included within the scope of the present disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the present disclosure. In this regard, for example, different combinations of elements and/or functions than those explicitly described above are also contemplated within the scope of the present disclosure. Although specific terms are employed herein, they are used in a generic and descriptive sense only and not for purposes of limitation.

The invention claimed is:

1. A marine information display assembly for installation on a marine vessel, the marine information display assembly comprising:
    a plurality of user interface displays for displaying marine data to a user, wherein each of the plurality of user interface displays includes a front face and a screen;
    an overlay pane defining a front face and a rear face, wherein the rear face of the overlay pane is bonded to the front face of each of the plurality of user interface displays such that each screen of the plurality of user interface displays is visible through the overlay pane; and
    a protective mounting frame configured to surround the plurality of user interface displays and abut the rear face of the overlay pane such that the front face of each of the plurality of user interface displays and a front face of the protective mounting frame lie in a same plane, wherein the protective mounting frame extends along the rear face of the overlay pane between at least two of the plurality of user interface displays.

2. The marine information display of claim 1, further comprising an integration hub including a communication interface configured to provide data communication between the plurality of user interface displays and one or more peripheral devices.

3. The marine information display of claim 2, wherein the communication interface comprises at least one Ethernet interface for controlling communications between the integration hub and the plurality of user interface displays.

4. The marine information display of claim 1, wherein the plurality of user interface displays each include a rear mounting connection configured to engage with a compression bracket, wherein the compression bracket is configured to hold the protective mounting frame in place against the overlay pane.

5. The marine information display of claim 1, wherein at least one of the plurality of user interface displays comprises a touchscreen.

6. The marine information display of claim 1, wherein the overlay pane is glass.

7. The marine information display of claim 1, wherein the overlay pane is polycarbonate.

8. The marine information display of claim 1, further comprising a mounting ring disposed around a periphery of the overlay pane.

9. A marine information display system for attachment to a marine vessel, the marine information display assembly comprising:
    a plurality of user interface displays, wherein each of the plurality of user interface displays includes a front face and a screen, wherein each front face is bonded to a rear face of an overlay pane such that the screen of each of the plurality of user interface displays is visible through the overlay pane;
    a protective mounting frame configured to surround the plurality of user interface displays and abut the rear face of the overlay pane, wherein the protective mounting frame defines a thickness, and wherein the thickness of the protective mounting frame is configured to surround each of the plurality of user interface displays, wherein the protective mounting frame extends along the rear face of the overlay pane between at least two of the plurality of user interface displays; and
    an integration hub in communication with the plurality of user interface displays, the integration hub including a processor, a communication interface, and memory.

10. The marine information display system of claim 9, further comprising computer programming code stored on the memory of the integration hub, wherein the computer programming code causes the processor to cause display of information on each of the plurality of user interface displays.

11. The marine information display system of claim 9, wherein each of the plurality of user interface displays includes a rear mounting connection configured to engage with a compression bracket, wherein the compression bracket is configured to hold the protective mounting frame in place against the overlay pane.

12. A method of manufacturing a marine information display, the method comprising:
    providing selectable size options for a plurality of user interface displays;
    providing selectable shape and size options for a periphery shape for an overlay pane;
    forming the overlay pane according to the selected shape and size option of the periphery shape, wherein the overlay pane includes a front face and a rear face; and
    bonding the selected plurality of user interface displays to the rear face of the overlay pane by bonding a front face of each of the plurality of user interface displays to the rear face of the overlay pane.

13. The method of claim 12, further comprising:
    connecting a capacitive touch panel to each of the plurality of user interface displays prior to the bonding.

14. The method of claim 12, further comprising:
    applying a protective laminate film to the overlay pane.

15. The method of claim 12, further comprising:
    connecting the plurality of user interface displays to an integration hub for transmission of power and data between the plurality of user interface displays and peripheral devices, wherein the integration hub includes a processor and a memory.

16. The method of claim 15, further comprising:
marking at least one of the overlay pane and the protective mounting frame with a logo according to a boat profile; and
storing computer-readable code indicating the boat profile in the memory of the integration hub.

17. The method of claim 12, further comprising:
inserting each of the plurality of user interface displays into a protective mounting frame;
connecting a compression bracket to a rear mounting connection of each of the plurality of user interface displays; and
rotating and tightening the compression bracket such that pressure is applied to the protective mounting frame directed toward the overlay pane.

18. A marine information display system for attachment to a helm of a marine vessel, the marine information display system comprising:
an overlay pane defining a front face and a rear face having a periphery shape with a width, wherein the width extends substantially across an entire width of the helm, and wherein the periphery shape of the overlay pane corresponds to one or more contours of the helm;
a user interface display for displaying marine data to a user, wherein the user interface display includes a front face and a screen, wherein the screen defines a width, wherein the front face is bonded to the rear face of the overlay pane such that the user interface display is visible through the overlay pane, wherein the width of the screen is less than the width of the overlay pane; and
a protective mounting frame configured to surround the user interface display and abut the rear face of the overlay pane.

19. A method of manufacturing a marine information display, the method comprising:
forming an overlay pane according to a periphery shape, wherein the overlay pane includes a front face and a rear face;
bonding a plurality of user interface displays to the rear face of the overlay pane by bonding a front face of each of the plurality of user interface displays to the rear face of the overlay pane;
inserting each of the plurality of user interface displays into a protective mounting frame;
connecting a compression bracket to a rear mounting connection of each of the plurality of user interface displays; and
rotating and tightening the compression bracket such that pressure is applied to the protective mounting frame directed toward the overlay pane.

* * * * *